(12) United States Patent
Kato et al.

(10) Patent No.: US 12,534,168 B2
(45) Date of Patent: Jan. 27, 2026

(54) SMALL WATERCRAFT SYSTEM AND METHOD OF CONTROLLING SMALL WATERCRAFT

(71) Applicant: Kawasaki Motors, Ltd., Hyogo (JP)

(72) Inventors: Hironori Kato, Akashi (JP); Toshio Araki, Akashi (JP); Hiroshi Tomomori, Akashi (JP); Kazumasa Hisada, Akashi (JP); Daisuke Kawai, Akashi (JP); Shohei Terai, Akashi (JP); Takuya Sakamoto, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 594 days.

(21) Appl. No.: 17/981,500

(22) Filed: Nov. 7, 2022

(65) Prior Publication Data

US 2023/0054594 A1 Feb. 23, 2023

Related U.S. Application Data

(63) Continuation-in-part of application No. 16/916,158, filed on Jun. 30, 2020, now Pat. No. 11,866,134.

(51) Int. Cl.
*B63C 9/00* (2006.01)
*B63B 34/10* (2020.01)
(Continued)

(52) U.S. Cl.
CPC ............ *B63C 9/0005* (2013.01); *B63B 34/10* (2020.02); *B63B 79/15* (2020.01); *B63B 79/40* (2020.01); *B63H 11/08* (2013.01); *B63H 11/107* (2013.01); *G05D 1/0022* (2013.01); *G05D 1/0206* (2013.01)

(58) Field of Classification Search
CPC ....... B63C 9/0005; B63B 79/15; B63B 79/40; B63B 34/10
See application file for complete search history.

(56) References Cited

U.S. PATENT DOCUMENTS

| | | | |
|---|---|---|---|
| 6,530,336 B2* | 3/2003 | Ibata | B63B 25/002 114/55.5 |
| 10,793,245 B1* | 10/2020 | Trotter | G08B 7/06 |

(Continued)

*Primary Examiner* — S. Joseph Morano
*Assistant Examiner* — Jovon E Hayes
(74) *Attorney, Agent, or Firm* — XSENSUS LLP

(57) ABSTRACT

A small watercraft system includes: a watercraft body; a watercraft body manipulation member through which a watercraft body manipulation command is input by an operator; a drive source that allows the watercraft body to plane; a steering device that allows the watercraft body to be steered; and a control device that controls the drive source and the steering device to operate the watercraft body. The control device determines whether a mode switching condition is satisfied, the mode switching condition including an operator's absence condition that the operator is absent from the watercraft body. Upon determining that the mode switching condition is satisfied, the control device executes an operator-absent manipulation mode in which the control device moves the watercraft body by controlling the drive source and the steering device based on an operator-absent manipulation command independent of the watercraft body manipulation command.

7 Claims, 13 Drawing Sheets

(51) Int. Cl.
  *B63B 79/15* (2020.01)
  *B63B 79/40* (2020.01)
  *B63H 11/08* (2006.01)
  *B63H 11/107* (2006.01)
  *G05D 1/00* (2006.01)

(56) References Cited

U.S. PATENT DOCUMENTS

| | | | |
|---|---|---|---|
| 11,603,172 B1* | 3/2023 | Duffy-Protentis | B63B 45/04 |
| 2016/0340006 A1* | 11/2016 | Tang | B63C 9/01 |
| 2020/0255104 A1* | 8/2020 | Gonring | B63H 21/21 |
| 2022/0058932 A1* | 2/2022 | Hjelmstad | G08B 29/188 |
| 2022/0284786 A1* | 9/2022 | Holmgren | G08G 5/76 |
| 2023/0059445 A1* | 2/2023 | Lammers-Meis | B63B 21/38 |
| 2024/0171942 A1* | 5/2024 | Bakke | H04W 4/029 |
| 2024/0400173 A1* | 12/2024 | Trotter | B63B 45/04 |

\* cited by examiner

SMALL WATERCRAFT SYSTEM AND METHOD OF CONTROLLING SMALL WATERCRAFT

CROSS-REFERENCE TO RELATED APPLICATION

This application is a continuation-in-part of U.S. application Ser. No. 16/916,158, filed Jun. 30, 2020, the entire contents of which are incorporated herein by reference.

BACKGROUND OF THE INVENTION

1. Technical Field

The present disclosure relates to small watercrafts.

2. Description of the Related Art

U.S. Pat. No. 6,530,336 discloses a personal watercraft (PWC) which is a type of small watercraft. Such a small watercraft may drift away on water for some reason while the operator is absent from the body of the small watercraft. In this event, for example, the operator may be forced to move to catch up with the drifting small watercraft in order to manipulate the small watercraft.

SUMMARY

A small watercraft according to an aspect of the present disclosure includes: a watercraft body; a watercraft body manipulation member that is mounted on the watercraft body and through which a watercraft body manipulation command is input by an operator; a drive source that is mounted on the watercraft body and that allows the watercraft body to plane; a steering device that is mounted on the watercraft body and that allows the watercraft body to be steered; and a control device that is mounted on the watercraft body and that controls the drive source and the steering device to operate the watercraft body, wherein the control device determines whether a mode switching condition is satisfied, the mode switching condition including an operator's absence condition that the operator is absent from the watercraft body, and upon determining that the mode switching condition is satisfied, the control device executes an operator-absent manipulation mode in which the control device moves the watercraft body by controlling the drive source and the steering device based on an operator-absent manipulation command independent of the watercraft body manipulation command.

A small watercraft control method according to an aspect of the present disclosure is a method of controlling a small watercraft, wherein the small watercraft includes: a watercraft body; a watercraft body manipulation member that is mounted on the watercraft body and through which a watercraft body manipulation command is input by an operator; a drive source that is mounted on the watercraft body and that allows the watercraft body to plane; and a steering device that is mounted on the watercraft body and that allows the watercraft body to be steered, the method including: determining whether a mode switching condition is satisfied, wherein the mode switching condition includes an operator's absence condition that the operator is absent from the watercraft body; and executing an operator-absent manipulation mode upon determining that the mode switching condition is satisfied, wherein in the operator-absent manipulation mode, the watercraft body is moved by controlling the drive source and the steering device based on an operator-absent manipulation command independent of the watercraft body manipulation command.

According to the above aspects, when the mode switching condition is satisfied, the watercraft body is moved based on the operator-absent manipulation command independent of the watercraft body manipulation command. In this case, the movement of the watercraft body is possible without the operator on board the watercraft body. This can reduce the operator's burden of catching up with the small watercraft which has drifted away on water.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, an exemplary embodiment of the present disclosure will be described with reference to the drawings. The directions as mentioned in the following description are those defined based on the viewpoint of the operator on board a small watercraft 2.

Configuration of Small Watercraft

In an exemplary embodiment, a personal watercraft (PWC) is described as an example of the small watercraft 2 included in a small watercraft system 1. Upon receiving a manipulation performed by the operator on board, the PWC ejects water from a water jet pump and thereby planes. The PWC changes its movement direction upon a change in the direction of the water ejection.

As described below, the small watercraft 2 is configured not only to be manipulated by the operator on board a watercraft body 100 of the small watercraft 2 but also to be movable even when the operator is away from the watercraft body 100. The small watercraft 2 operates in either of two modes, one of which is a watercraft body manipulation mode where the watercraft body 100 is operated in response to manipulations performed by the operator on board the watercraft body 100 and the other of which is an operator-absent manipulation mode where the watercraft body 100 is operated in the absence of the operator from the watercraft body 100. In the operator-absent manipulation mode, for example, the small watercraft 2 is controlled to move to a target location such that the distance the operator has to move to catch up with the small watercraft 2 is reduced.

Figure 1:
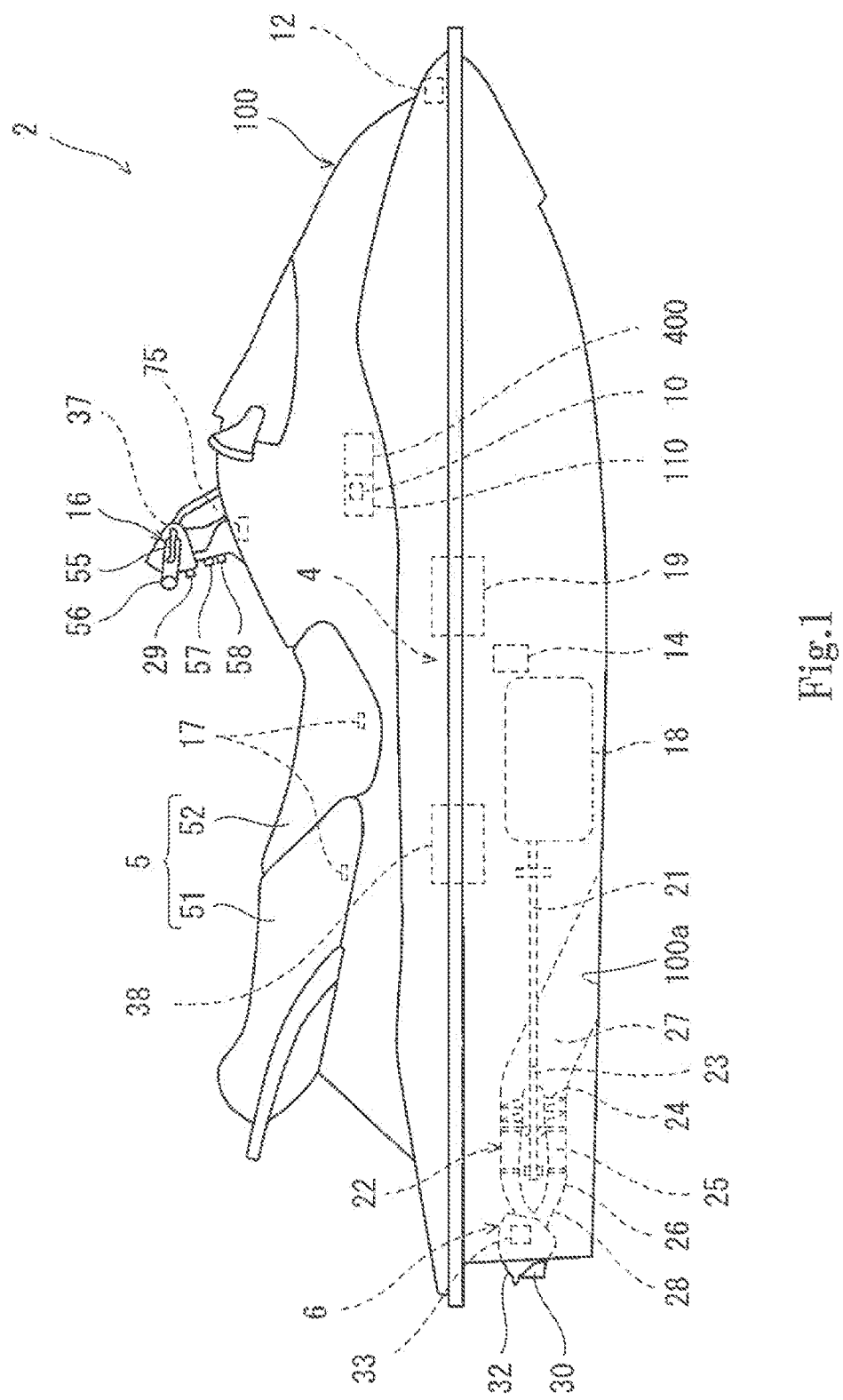
FIG. 1 is a side view of a small watercraft of an exemplary embodiment.

As shown in FIG. 1, the small watercraft 2 includes the watercraft body 100, at least one watercraft body manipulation member 16, a drive source 18, an electric power supply device 14, a steering device 6, a control device 400, and a battery 38. The watercraft body 100 is configured to have a hollow structure including a hull for obtaining buoyancy and a deck covering the hull. In the internal space of the watercraft body 100 there are mounted other components.

The watercraft body manipulation member 16 is a member that is mounted on the watercraft body 100 and through which a watercraft body manipulation command is input by the operator on board the watercraft body 100. In the present embodiment, the watercraft body 100 is equipped with a plurality of watercraft body manipulation members 16. The watercraft body manipulation members 16 include, for example, an accelerator lever 55, a handle 56, a main switch 57, and a starter switch 58.

The drive source 18 is a propulsion source that is mounted on the watercraft body 100 and that allows the watercraft body 100 to plane. The drive source 18 of the present embodiment is embodied by an engine configured as an internal combustion engine. The drive source 18 is controlled by the control device 400. Specifically, the drive source 18 is controlled to output an output torque as a function of the amount of manipulation of the accelerator lever 55 by the operator. An impeller 24 of a water jet pump 22 is rotationally driven in response to the output of the drive source 18. Thus, the watercraft body 100 is propelled by a reaction force resulting from water ejection by the impeller 24.

The electric power supply device 14 of the present embodiment is embodied by an electric circuit. The electric power supply device 14 electrically connects the battery 38 to various electric components 8 (see FIG. 4) in response to a turn-on manipulation of the main switch 57 by the operator. With this electrical connection established, the electric power supply device 14 supplies electric power to the various electric components 8. The electric power supply device 14 also supplies electric power to a starter motor 61 in response to a manipulation of the starter switch 58 by the operator. The starter motor 61 functions to start the engine serving as the drive source 18 (sometimes simply referred to as "engine" hereinafter). Thus, the electric power supply device 14 serves to start the engine.

The starter switch 58 is a watercraft body activation manipulation member through which a watercraft body activation command to activate the drive source 18 is input by the operator. The electric power supply device 14 breaks the electrical connection of the battery 38 with the various electric components 8 in response to a turn-off manipulation of the main switch 57 by the operator. Thus, the electric power supply device 14 stops supply of electric power to the engine and the various electric components 8.

The steering device 6 is mounted on the watercraft body 100 and allows the watercraft body 100 to be steered. The steering device 6 changes the direction of the water ejection from the water jet pump 22 as a function of the amount of a pivoting manipulation of the handle 56 by the operator. Specifically, the steering device 6 includes a manipulation force transmission mechanism including a wire through which a pivoting force applied to the handle 56 is transmitted. The steering device 6 transmits to a steering nozzle 30 described later a manipulation force applied to the handle 56 by the operator, thus shifting the orientation of the steering nozzle 30. The propulsion direction of the watercraft body 100 is shifted upon a change in the direction of the water ejection from the water jet pump 22.

The watercraft body 100 is provided with a seat portion 5 astride which riders sit. In an exemplary embodiment, the seat portion 5 includes an operator seat 51 and a passenger seat 52. The operator seat 51 and the passenger seat 52 are adjacently arranged in the forward/rearward direction. The operator seat 51 is disposed in proximity to the watercraft body manipulation members 16 and forms the front side of the seat portion 5. The operator sitting on the operator seat 51 can manipulate the watercraft body 100 by manipulating the watercraft body manipulation members 16 mentioned above. The passenger seat 52 is a seat for a person who does not participate in manipulating the watercraft body.

The small watercraft 2 includes an operator's absence detection device that detects that the operator is absent from the watercraft body 100. In an exemplary embodiment, the operator's absence detection device is configured by an electric circuit. For example, the operator's absence detection device includes a tether switch 29 in the form of an insertion removably attached to the watercraft body 100. For example, the tether switch 29 is connected to the body of the operator on board the watercraft body 100 through a cable. In this case, once the operator becomes absent from the watercraft body 100 which is in operation, the tether switch 29 is detached from the watercraft body 100 together with the operator, and this detachment causes a change in the current flowing through the electric circuit installed in the watercraft body 100. With the use of the tether switch 29 as a part of the electric circuit installed in the watercraft body 100, the detachment of the tether switch 29 and therefore the absence of the operator from the watercraft body 100 can be detected based on a current change in the electric circuit.

Once the detachment of the tether switch 29 from the watercraft body 100 is detected, the electric power supply device 14 breaks the electrical connection of the battery 38 with the various electric components 8 and stops supply of electric power to the engine and the various electric components 8. For example, the tether switch 29 may constitute a part of the electric power supply circuit. In this manner, the supply of electric power to the various electric components 8 may be stopped due to that breaking of the electric circuit of the watercraft body 100 which is induced by the detachment of the tether switch 29. In the small watercraft 2, as described below, the supply of electric power to an operator-absent control unit 7 is not stopped even in the event of the detachment of the tether switch 29 from the watercraft body 100.

The small watercraft 2 includes: the water jet pump 22 from which water is jetted; a water feed passage 27 through which water present around the watercraft body 100 is delivered to the water jet pump 22; a vane accommodation space 26; and a nozzle space 28.

The water jet pump 22 includes: a propeller shaft 21 having one end connected to an output shaft of the drive source 18; a pump shaft 23 having one end connected to the other end of the propeller shaft 21; the impeller 24 mounted on the pump shaft 23; and a stator vane 25. The impeller 24 receives the rotational power of the drive source 18 transmitted through the propeller shaft 21 and the pump shaft 23. The stator vane 25 is disposed downstream of the impeller 24 in the ejection direction and adjusts the stream of water delivered under pressure from the impeller 24 so as to prevent swirling of the stream of water.

The water feed passage 27 includes a feed water inlet 100 a opening at the bottom of the watercraft body 100. The water feed passage 27 extends from the feed water inlet 100 a in the forward/rearward direction and communicates with the vane accommodation space 26. The vane accommodation space 26 accommodates the impeller 24 and the stator vane 25 and is formed in a tubular shape extending along a rear portion of the pump shaft 23 in the forward/rearward direction. The vane accommodation space 26 is connected to the nozzle space 28 at a point downstream of the stator vane 25 in the ejection direction. The nozzle space 28 extends in the forward/rearward direction, and the diameter of the nozzle space 28 decreases downstream in the ejection direction. A nozzle orifice opens at the downstream end of the nozzle space 28 in the ejection direction.

The impeller 24 rotates in conjunction with the rotation of the output shaft of the drive source 18. The rotational power of the impeller 24 causes water to be drawn into the water feed passage 27 through the feed water inlet 100 a. The stream of water delivered under pressure downstream of the impeller 24 in the ejection direction is adjusted by the stator vane 25. The stream of water moves through the nozzle orifice to the steering nozzle 30 of the steering device 6 and is vigorously ejected rearwardly of the watercraft body 100. The watercraft body 100 obtains a propulsion power from the reaction force of the ejected water. The rotational speed of the impeller 24 is changed by control of the output of the drive source 18. A change in the rotational speed of the impeller 24 causes a change in the propulsion speed of the watercraft body 100.

As stated above, the small watercraft 2 set to the watercraft body manipulation mode is operated in response to manipulations performed by the operator on board. In order for the operator on board the watercraft body 100 to manipulate the watercraft body 100, the watercraft body 100 is equipped with the various watercraft body manipulation members 16. The watercraft body 100 is equipped with the handle 56 which can be held by the operator sitting on the operator seat 51. The handle 56 is located forward of the seat portion 5. The handle 56 is coupled to a stern shaft so as to be pivotable about a pivot axis extending in the upward/downward direction. As stated above, the pivoting force applied to the handle 56 by the operator is transmitted to the steering nozzle 30 through a given lever and acts as a steering force to cause the steering nozzle 30 to pivot.

The steering nozzle 30 is disposed downstream of the nozzle orifice in the ejection direction. The steering nozzle 30 is supported by the watercraft body 100 so as to be pivotable about a nozzle pivot axis defined in the vicinity of the nozzle orifice and extending in the upward/downward direction. The steering nozzle 30, which is angularly movable about the nozzle pivot axis, serves as a guide by which the ejection direction of the stream of water coming through the nozzle orifice is shifted leftward or rightward.

The handle 56 is equipped with the accelerator lever 55. The watercraft body 100 includes an accelerator position sensor (APS) 59 serving as a manipulation amount sensor that detects the amount of manipulation of the accelerator lever 55. The accelerator position sensor 59 detects the amount of manipulation of the accelerator lever 55 and provides a signal indicating the detected amount of manipulation to the control device 400.

The control device 400 is mounted on the watercraft body 100 and controls the drive source 18 and the steering device 6 to operate the watercraft body 100. The control device 400 estimates an acceleration demand from the operator based on a signal provided from the accelerator position sensor 59. The control device 400 controls the engine by providing an operation command to the engine based on the estimated acceleration demand. For example, the control device 400 provides a throttle position command value to the engine such that the amount of intake air supplied to the engine increases as the acceleration demand increases. Thus, the small watercraft 2 can obtain a propulsion power (rotation of the impeller 24) matched to the acceleration demand from the operator. The control of the throttle position can be accomplished, for example, by means of an electrically-operated throttle valve.

The steering device 6 includes, in addition to the steering nozzle 30 by which the direction of the stream of water is shifted leftward or rightward, a reverse bucket 32 by which the direction of the ejection of the stream of water is switched between the forward direction and the rearward direction. Once the ejection of the stream of water is directed forward by the reverse bucket 32, the watercraft body 100 moves rearwardly. Thus, the reverse bucket 32 is also a part of the steering device 6.

The reverse bucket 32 is bowl-shaped and disposed downstream of the steering nozzle 30 in the ejection direction. The reverse bucket 32 is supported by the watercraft body 100 so as to be pivotable about a bucket pivot axis extending in the leftward/rightward direction. The steering device 6 includes a bucket actuator 15 that causes the reverse bucket 32 to pivot about the bucket pivot axis.

The bucket actuator 15 is embodied, for example, by an electric motor. The reverse bucket 32 is configured to switch between a forward movement position and a rearward movement position. The forward movement position is a position where the reverse bucket 32 is located above the steering nozzle 30 so that all of the ejection orifice of the steering nozzle 30 is open in the rear direction. The rearward movement position is a position where the reverse bucket 32 is located facing the steering nozzle 30 so as to cover all of the ejection orifice of the steering nozzle 30 from the rear.

When the reverse bucket 32 is in the forward movement position, the stream of water is ejected rearwardly without being redirected by the reverse bucket 32. When the reverse bucket 32 is in the rearward movement position, the stream of water is redirected by the reverse bucket 32 and ejected forward. The bucket actuator 15 is configured to allow the reverse bucket 32 to pivot between the above forward movement position and rearward movement position.

The watercraft body manipulation members 16 of the watercraft body 100 further include a reverse lever 75. The small watercraft 2 includes a reverse position sensor (RPS) 60 serving as a manipulation amount sensor that detects the amount of manipulation of the reverse lever 75. The reverse position sensor 60 detects the amount of manipulation of the reverse lever 75 and provides a signal indicating the detected amount of manipulation to the control device 400. The control device 400 estimates a reverse movement demand from the operator based on the signal provided from the reverse position sensor 60. The control device 400 controls the position of the reverse bucket 32 by providing an operation command to the bucket actuator 15 based on the estimated reverse movement demand.

Small Watercraft System

Figure 2:
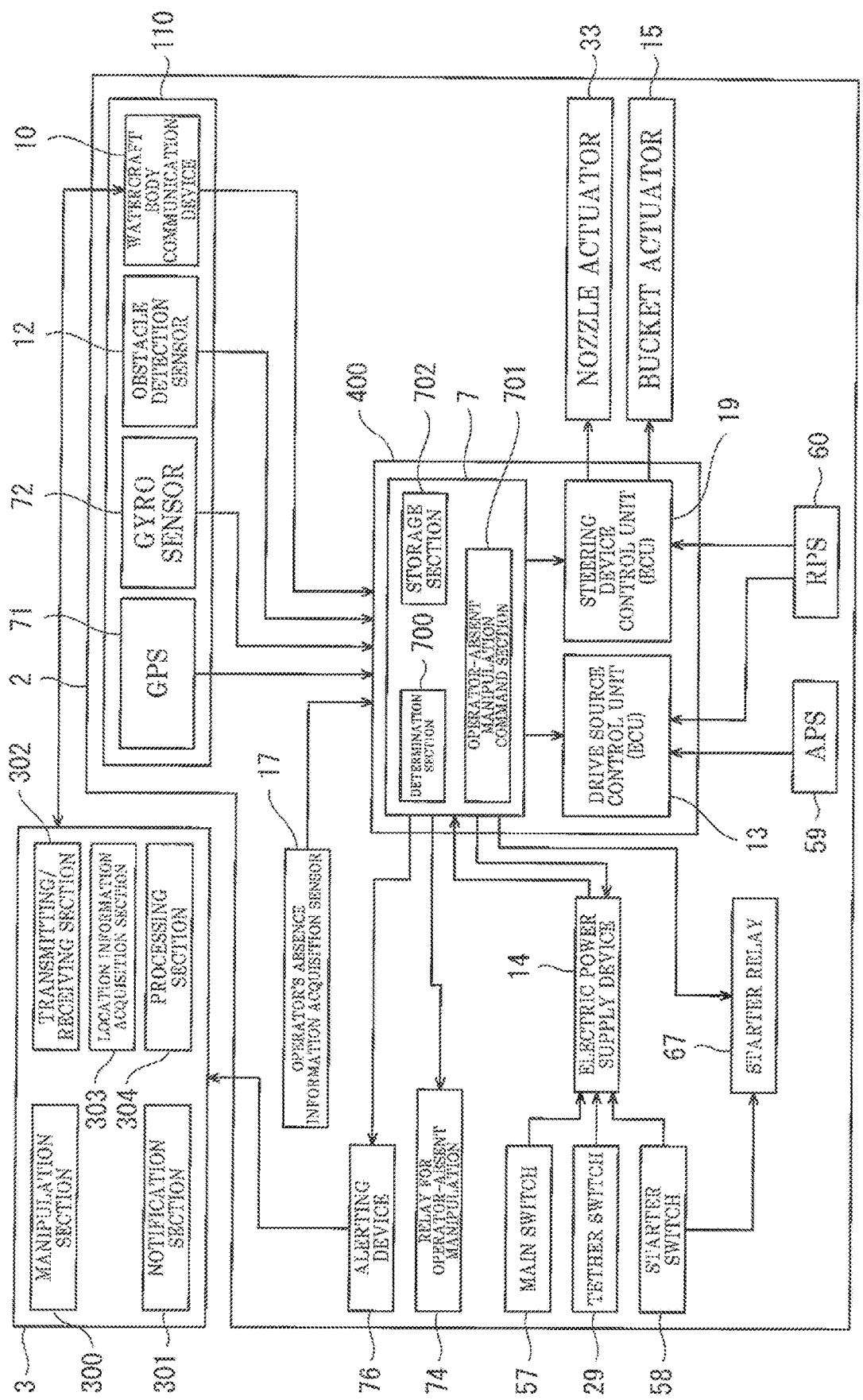
FIG. 2 is a signal line diagram of a small watercraft system including the small watercraft.

FIG. 2 is a signal line diagram of the small watercraft system which includes the small watercraft 2 of an exemplary embodiment. The small watercraft system includes, in addition to the small watercraft 2, an outboard device 3 described later. The control device 400 of the small watercraft 2 includes a drive source control unit 13 for control of the drive source 18. The drive source control unit 13 of an exemplary embodiment is connected to various actuators mounted for the engine so as to be capable of transmitting commands to the actuators. Thus, the control device 400 can control the engine by providing operation commands to the actuators for the engine. Examples of the actuators include an electrically-operated throttle valve, an ignition plug, and a fuel injector.

The drive source control unit 13 is connected to various sensors mounted for the engine so as to be capable of receiving detection signals from the sensors. Thus, the control device 400 can generate operation commands based on information obtained from the sensors. Examples of the sensors include existing sensors used for engines, such as an intake air temperature sensor and an engine speed sensor. Based on the accelerator manipulation amount provided from the accelerator position sensor 59, the drive source control unit 13 generates operation commands to be transmitted to the actuators for the engine.

The control device 400 incudes a steering device control unit 19 for control of the steering device 6. The steering device control unit 19 of the present embodiment is connected to the reverse position sensor 60 so as to be capable of receiving detection signals from the reverse position sensor 60. The steering device control unit 19 is connected to the bucket actuator 15 so as to be capable of transmitting commands to the bucket actuator 15. Based on the reverse manipulation amount provided from the reverse position sensor 60, the steering device control unit 19 generates operation commands to be transmitted to the bucket actuator 15. Thus, the control device 400 can control the position of the reverse bucket 32.

The electric power supply device 14 is connected to the main switch 57, the starter switch 58, and the tether switch 29 so as to be capable of receiving signals from these switches. Thus, the electric power supply device 14 can control supply of electric power to the various electric components 8 based on switch manipulations performed by the operator.

As stated above, the small watercraft 2 can operate in the operator-absent manipulation mode in which the watercraft body 100 can be moved in the absence of the operator from the watercraft body 100. The control device 400 includes the operator-absent control unit 7 for enabling manipulations in the operator-absent manipulation mode. The operator-absent control unit 7 includes a determination section 700. The determination section 700 determines whether a mode switching condition is satisfied. The mode switching condition includes an operator's absence condition that the operator is absent from the watercraft body 100. The mode switching condition is provided for switching of the mode of the small watercraft 2 from the watercraft body manipulation mode to the operator-absent manipulation mode. For example, the operator-absent control unit 7 is connected to an operator's absence information acquisition sensor 17 provided for determination of whether the mode switching condition is satisfied, and this connection is made such that the operator-absent control unit 7 can receive a signal from the operator's absence information acquisition sensor 17. Based on the signal provided from the operator's absence information acquisition sensor 17, the determination section 700 determines whether the operator is absent from the watercraft body 100.

The operator's absence information acquisition sensor 17 transmits to the operator-absent control unit 7 a signal containing information that allows the operator-absent control unit 7 to infer the absence of the operator from the watercraft body 100. The operator's absence information acquisition sensor 17 is, for example, a pressure-sensitive sensor disposed beneath the seat portion 5 and configured to detect the presence or absence of the operator based on a pressing force applied to the seat portion 5. Alternatively, the operator's absence information acquisition sensor 17 may include an antenna device configured to receive a radio wave transmitted from a communication device carried by the operator and detect the presence or absence of the operator on board the watercraft body 100 by determining whether the signal intensity of the radio wave is higher than a reference value. Alternatively, for example, the function of the operator's absence information acquisition sensor 17 may be performed by the tether switch 29.

Alternatively, for example, the operator's absence information acquisition sensor 17 may be an infrared sensor configured as a position sensitive detector (PSD) mounted on a surface of the seat portion 5. In this case, the operator's absence information acquisition sensor 17 includes a light-emitting element that emits infrared light and a light-receiving element that receives light emitted from the light-emitting element and reflected by an object (the operator on board the watercraft body 100 in this example). In the infrared sensor, the output voltage of the light-receiving element changes as a function of the amount of reflected light received by the light-receiving element. The infrared sensor detects the presence or absence of the operator on board the watercraft body 100 based on the change in the output voltage of the light-receiving element. The operator's absence information acquisition sensor 17 as described above may be disposed on a component other than the seat portion 5 and may be disposed on the deck surrounding the seat portion 5. The type of the operator's absence information acquisition sensor 17 is not limited to those mentioned above.

The small watercraft 2 further includes a manipulation information acquisition device 110 mounted on the watercraft body 100. The operator-absent control unit 7 includes an operator-absent manipulation command section 701. Once the determination section 700 determines that the mode switching condition is satisfied, the operator-absent manipulation command section 701 generates an operator-absent manipulation command which is independent of the watercraft body manipulation commands which are input through the watercraft body manipulation members 16. The manipulation information acquisition device 110 is used by the operator-absent control unit 7 to generate the operator-absent manipulation command.

The manipulation information acquisition device 110 is connected to the operator-absent control unit 7. A signal output from the manipulation information acquisition device 110 is received by the operator-absent control unit 7. The operator-absent manipulation command section 701 generates the operator-absent manipulation command based on the signal provided from the manipulation information acquisition device 110. For example, the operator-absent manipulation command is a command which, when the small watercraft 2 has drifted away, causes the small watercraft 2 to move to a given target location such that the movement the operator has to make to approach the small watercraft 2 can be reduced.

Examples of the manipulation information acquisition device 110 include a device that acquires coordinate information of the location of the watercraft body (watercraft body location information acquisition device) and a device that acquires the orientation (propulsion direction) of the watercraft body 100. In this case, the manipulation information acquisition device 110 may include, for example, a GPS device 71 employing a global positioning system (GPS). The manipulation information acquisition device 110 may include a gyro sensor 72 such as an inertial measurement unit (IMU) which detects the orientation of the watercraft body 100.

The manipulation information acquisition device 110 may include an obstacle detection sensor 12 that detects an obstacle located in the surroundings of the watercraft body 100. An example of the obstacle detection sensor 12 is a proximity sensor that detects an object located in the surroundings of the watercraft body 100 by using an electromagnetic wave or a sonic wave. The manipulation information acquisition device 110 may include a watercraft body communication device 10 including an antenna that receives an external command transmitted from the outboard device 3. For example, the manipulation information acquisition device 110 of the present embodiment includes the watercraft body communication device 10, the obstacle detection sensor 12, the gyro sensor 72, and the GPS device 71 which are mentioned above.

The operator-absent control unit 7 is connected to the drive source control unit 13 and the steering device control unit 19 so as to be capable of signal transmission to the units 13 and 19. The operator-absent control unit 7 can provide a predetermined operator-absent propulsion command to the drive source control unit 13 to cause the drive source control unit 13 to operate to generate a propulsion power for the watercraft body 100. The operator-absent control unit 7 can provide a predetermined operator-absent steering command to the steering device control unit 19 to cause the steering device control unit 19 to operate to control steering actuators and steer the watercraft body 100.

The small watercraft 2 of an exemplary embodiment includes a nozzle actuator 33 and the bucket actuator 15 as the steering actuators. The nozzle actuator 33 causes the steering nozzle 30 to pivot about the nozzle pivot axis. The nozzle actuator 33 is embodied, for example, by an electric motor. The nozzle actuator 33 includes an output shaft coupled to the steering nozzle 30. The coupling of the output shaft of the nozzle actuator 33 to the steering nozzle 30 may be accomplished via a linkage mechanism. The steering nozzle 30 pivots about the nozzle pivot axis in conjunction with pivoting of the output shaft of the nozzle actuator 33.

The steering device control unit 19 is connected to the nozzle actuator 33 so as to be capable of transmitting commands to the nozzle actuator 33. In the operator-absent manipulation mode, the operator-absent control unit 7 can provide the operator-absent steering command to the steering device control unit 19 to cause the steering device control unit 19 to steer the watercraft body 100. In an exemplary embodiment, the control device 400 can provide a steering command to the nozzle actuator 33 to shift the movement direction of the watercraft body 100 leftward or rightward and can also provide a steering command to the bucket actuator 15 to switch the movement direction of the watercraft body 100 between the forward direction and the rearward direction.

Each of the control units 7, 13, and 19 described above is embodied, for example, by a processing circuit. Specifically, each of the control units 7, 13, and 19 is embodied, for example, by a memory, a processor, and an interface. The memory stores a processing program to be executed by the corresponding one of the control units 7, 13, and 19.

The interface receives input information provided from an external device connected to the corresponding one of the control units 7, 13, and 19. The interface provides output information to the external device connected to the corresponding one of the control units 7, 13, and 19.

The functionality of the elements disclosed herein including but not limited to the control device 400 and the control units 7, 13, and 19 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The processor retrieves the processing program from the memory. The processor executes the processing program based on the input information provided through the interface. The processor provides a processing result obtained according to the processing program to the connected external device through the interface. For example, the operator-absent control unit 7 executes a determination program for determining whether to perform mode switching and a command output program for outputting the operator-absent manipulation command. In an exemplary embodiment, the control device 400 is embodied by electric circuits respectively mounted on different substrates to implement the respective functions of the control units 7, 13, and 19.

In the watercraft body manipulation mode, the control device 400 controls the drive source 18 based on the manipulation amount input to the accelerator position sensor 59 and controls the reverse bucket 32 based on the manipulation amount input to the reverse position sensor 60. In the watercraft body manipulation mode, the control device 400 gives priority to steering performed by the operator manipulating the handle 56. In other words, in the watercraft body manipulation mode, the control device 400 acts, for example, so as to prevent the nozzle actuator 33 from influencing the steering by the operator. In the watercraft body manipulation mode, for example, the control device 400 does not provide any steering command to the nozzle actuator 33. In the watercraft body manipulation mode, for example, the control device 400 controls the nozzle actuator 33 to reduce the steering resistance imposed by the nozzle actuator 33.

In the operator-absent manipulation mode, the control device 400 controls the drive source 18, reverse bucket 32, and steering nozzle 30 based on operator-absent manipulation commands generated by the operator-absent control unit 7 independently of manipulation inputs provided by the operator through the watercraft body manipulation members 16. The provision of the operator-absent manipulation mode makes it possible, when the small watercraft 2 has drifted away, to move the small watercraft 2 to a target location such that the movement the operator has to make to approach the small watercraft 2 can be reduced.

Overall Operation of Small Watercraft

Figure 3:
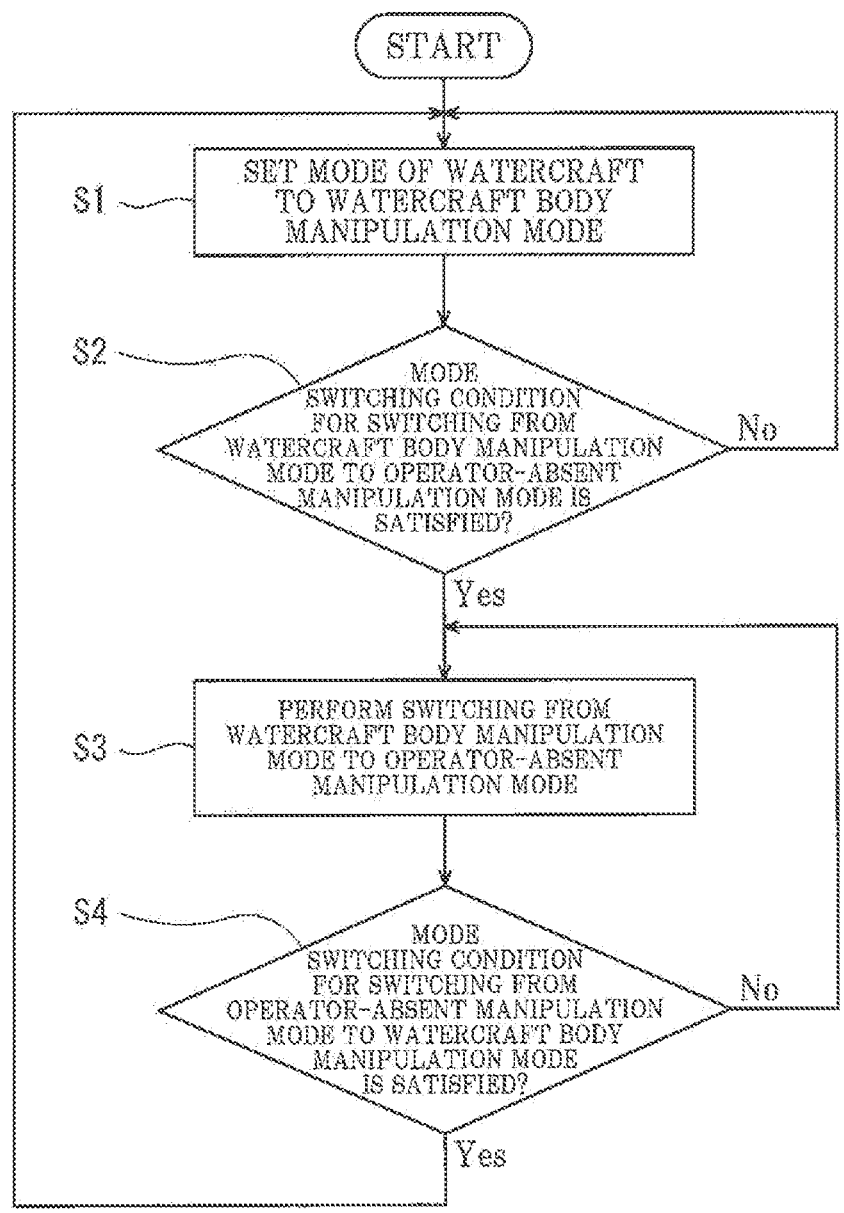
FIG. 3 is a flowchart illustrating the operation of a control device of an exemplary embodiment.

FIG. 3 is a flowchart illustrating the operation of the control device 400 according to an exemplary embodiment. Upon the start of supply of electric power, the control device 400 proceeds to step S1. In step S1, the control device 400 sets the mode of the small watercraft 2 to the watercraft body manipulation mode. In the watercraft body manipulation mode, the control device 400 enables the watercraft body 100 to be controlled based on watercraft body manipulation commands which are input by the operator through the watercraft body manipulation members 16.

Once a predetermined determination time point is reached while the small watercraft 2 is operated in the watercraft body manipulation mode, the control device 400 proceeds to step S2. In step S2, the control device 400 determines, based on information provided from the manipulation information acquisition device 110 mounted on the watercraft body 100, whether the mode switching condition for switching the mode of the small watercraft 2 from the watercraft body manipulation mode to the operator-absent manipulation mode is satisfied. In this manner, the control device 400 executes the operator-absent manipulation mode switching determination process.

Upon determining in step S2 that the mode switching condition is not satisfied (step S2: No), the control device 400 returns to step S1 and keeps the small watercraft 2 in the watercraft body manipulation mode. Upon determining in step S2 that the mode switching condition is satisfied (step S2: Yes), the control device 400 proceeds to step S3.

In step S3, the control device 400 switches the mode of the small watercraft 2 from the watercraft body manipulation mode to the operator-absent manipulation mode and performs control such that the watercraft body 100 is moved in the operator-absent manipulation mode. In this mode, the control device 400 generates operator-absent manipulation commands independent of manipulation inputs provided through the watercraft body manipulation members 16. The control device 400 controls the drive source 18, reverse bucket 32, and steering nozzle 30 based on the operator-absent manipulation commands generated respectively for the drive source 18, reverse bucket 32, and steering nozzle 30. In this manner, the control device 400 executes the operator-absent manipulation mode process.

In the operator-absent manipulation mode, the control device 400 may control the watercraft body 100 such that the watercraft body 100 is moved along a movement route determined based on the various sensors. In the operator-absent manipulation mode, the control device 400 may control the movement of the watercraft body 100 such that the watercraft body 100 is moved along a movement route determined based on a manipulation (outboard manipulation) performed by the operator who is away from the watercraft body 100. In the event that supply of electric power to the electric components 8 that perform control of the watercraft body 100 has been stopped when the watercraft body 100 should be manipulated in the operator-absent manipulation mode, the control device 400 controls the electric power supply device 14 such that the electric power supply device 14 supplies electric power to the electric components 8.

Once a predetermined determination time point is reached while the small watercraft 2 is operated in the operator-absent manipulation mode, the control device 400 proceeds to step S4. In step S4, the control device 400 determines, based on information provided from the manipulation information acquisition device 110 mounted on the watercraft body 100, whether a mode switching condition for switching the mode of the small watercraft 2 from the operator-absent manipulation mode to the watercraft body manipulation mode is satisfied.

Upon determining in step S4 that the mode switching condition for switching from the operator-absent manipulation mode to the watercraft body manipulation mode is not satisfied (step S4: No), the control device 400 returns to step S3 and keeps the watercraft body 100 in the operator-absent manipulation mode. Upon determining in step S4 that the mode switching condition for switching from the operator-absent manipulation mode to the watercraft body manipulation mode is satisfied (step S4: Yes), the control device 400 returns to step S1.

As described above, the control device 400 can perform switching of the operation mode of the small watercraft 2 based on the two mode switching conditions which are respectively used for determination in step S2 and determination in step S4. Thus, even in the event that the small watercraft 2 without the operator on board drifts away on water, control of the movement of the small watercraft 2 can be enabled by setting the mode of the small watercraft 2 to the operator-absent manipulation mode. As such, in the event that the small watercraft 2 drifts away on water, the small watercraft 2 can be moved to a target location such that the movement the operator has to make to approach the small watercraft 2 can be reduced. Possible examples of situations where the small watercraft 2 drifts away on water include, but are not limited to, a situation where a mooring cable for mooring the watercraft body 100 to a pier is untied from the pier.

In the operator-absent manipulation mode of the present embodiment, the control device 400 moves the watercraft body 100 at a lower propulsion power and a lower speed (e.g., a slow speed) than in the watercraft body manipulation mode where the watercraft body 100 is operated based on the watercraft body manipulation commands input through the watercraft body manipulation members 16. Specifically, for example, in the operator-absent manipulation mode, the control device 400 controls the electrically-operated throttle valve mounted in the engine and thereby controls the engine speed such that the propulsion speed of the watercraft body 100 is adjusted to a predetermined slow speed.

The engine speed in the operator-absent manipulation mode is set lower than an engine speed at which a peak output is achieved in the watercraft body manipulation mode. For example, the engine speed in the operator-absent manipulation mode may be set to an engine speed slightly higher than a so-called idling speed which is an engine speed exhibited when the throttle lever is not manipulated. For example, the engine speed in the operator-absent manipulation mode may be set to an engine speed higher than 100% of the idling speed and equal to or lower than 120% of the idling speed, although other percentages are possible.

When the mode of the small watercraft 2 can be set to a mode other than the watercraft body manipulation mode and the operator-absent manipulation mode (the other mode may be referred to as "third mode" hereinafter), for example, the control device 400 may move the watercraft body 100 at a lower propulsion power and a lower speed in the operator-absent manipulation mode than in the third mode. For example, when the third mode is a mode where the output of the drive source 18 is limited, the control device 400 may, in the operator-absent manipulation mode, move the watercraft body 100 at the same or a lower propulsion power and the same or a lower speed than in the third mode.

Examples of the third mode in which the output of the drive source 18 is limited include: a mode in which the propulsion speed is limited in a sea region near the shore (what may be called "5-mile mode"); a beginner mode in which the output of the drive source 18 is regulated on the assumption of the low proficiency of the operator; and a limp home mode in which the propulsion speed is limited due to detection of an abnormality.

When the small watercraft 2 can be propelled at an idling speed, the engine speed in the operator-absent manipulation mode may be set to the idling speed. For example, in the operator-absent manipulation mode, the engine speed may be set such that the propulsion speed is equal to or lower than a predetermined value. The predetermined value in this case may be, for example, 10 km/h or less, and may be preferably 5 km/h or less, although other predetermined speed values are possible.

The engine speed in the operator-absent manipulation mode may be set to 3000 rpm or less, although other engine speeds are possible. In this case, if the propulsion speed of the watercraft body 100 propelled in the operator-absent manipulation mode exceeds a predetermined value due to inertia or the influence of tidal or aerial current, the control device 400 may adjust the propulsion speed of the watercraft body 100 to a value equal to or lower than the predetermined value by stopping output of the engine or by controlling the bucket actuator 15 such that a jet of water is directed forward.

As shown in FIG. 2, the small watercraft 2 may include an alerting device 76 mounted on the watercraft body 100. In this case, the control device 400 may be connected to the alerting device 76 so as to be capable of controlling the alerting device 76. The alerting device 76 is a device that emits at least sound or light toward the surroundings of the watercraft body 100. The alerting device 76 is embodied, for example, by a speaker or a light. Once the mode of the small watercraft 2 is switched from the watercraft body manipulation mode to the operator-absent manipulation mode, the control device 400 may control the alerting device 76 such that the alerting device 76 emits information indicating the setting of the small watercraft 2 to the operator-absent manipulation mode (warning sound or warning light) toward the surroundings of the watercraft body 100. This allows a person located in the surroundings of the watercraft body 100 to easily know that the small watercraft 2 has been set to the operator-absent manipulation mode.

Figure 4:
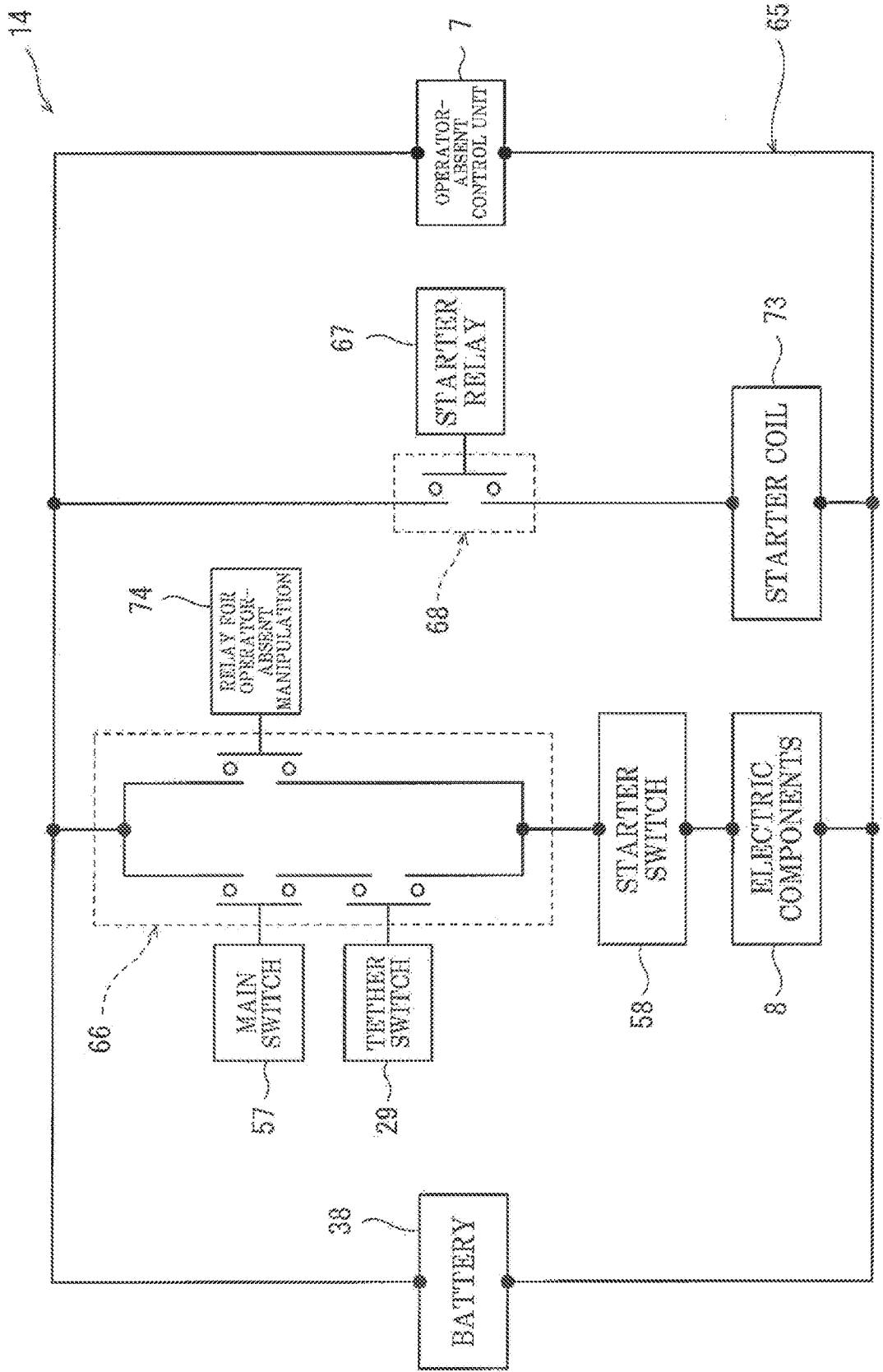
FIG. 4 is a schematic circuit diagram of an electric power supply device of an exemplary embodiment.

FIG. 4 is a schematic circuit diagram of the electric power supply device 14 of an exemplary embodiment. The electric power supply device 14 includes a main circuit 65. The main circuit 65 includes a main opening-closing circuit 66 that opens and closes the main circuit 65 based on signals provided from the main switch 57. With the main circuit 65 closed, the electric power supply device 14 supplies electric power to the various electric components 8 connected to the main circuit 65. Once the main circuit 65 is opened, the electric power supply device 14 stops supply of electric power to the various electric components 8 connected to the main circuit 65. The electric components 8 connected to the main circuit 65 are electric components operable with relatively low electric power, and examples of the electric components include electric motors (those for an electrically-operated throttle and a reverse actuator), a meter display, the drive source control unit 13, the steering device control unit 19, and various sensors.

The main opening-closing circuit 66 opens the main circuit 65 not only based on a signal provided from the main switch 57 but also based on an operator's absence signal provided in response to a manipulation of the tether switch 29. Thus, supply of electric power to the electric components 8 can be stopped when the operator is absent from the watercraft body 100. The main opening-closing circuit 66 may be embodied by a relay element or by a switching circuit including a switching element.

The electric power supply device 14 further includes a starter relay 67 to which signals are provided from the starter switch 58. The starter relay 67 is operated to open and close a starter opening-closing circuit 68 based on the signals provided from the starter switch 58. Once the starter relay 67 is closed, the starter opening-closing circuit 68 is closed. Once the starter relay 67 is opened, the starter opening-closing circuit 68 is opened. With the starter opening-closing circuit 68 closed, the electric power supply device 14 supplies electric power to a starter coil 73 connected to the starter relay 67. This electric power supply allows the crankshaft to generate rotational power required for start of the engine. Once the provision of the activation signal from the starter switch 58 ceases, the electric power supply device 14 opens the starter relay 67 to stop supply of electric power to the starter coil 73.

Among the above-described components of the control device 400, at least the operator-absent control unit 7 is configured to enable supply of electric power to the electric components 8 when any input from the operator is provided neither to the main switch 57 nor to the starter switch 58. Specifically, for example, the operator-absent control unit 7 of an exemplary embodiment is electrically connected to the battery 38 via a circuit independent of the main opening-closing circuit 66 and the starter relay 67. Thus, the operator-absent control unit 7 receives supply of electric power even when the main opening-closing circuit 66 or starter opening-closing circuit 68 is open. In other words, the electric power supply device 14 is configured to supply electric power to the operator-absent control unit 7 independently of the main opening-closing circuit 66 and the starter opening-closing circuit 68.

The operator-absent control unit 7 is configured to provide an operation signal to the main opening-closing circuit 66. Specifically, the operator-absent control unit 7 is configured to provide a signal to the main opening-closing circuit 66 such that the main opening-closing circuit 66 is closed. Thus, the operator-absent control unit 7 can enable supply of electric power to the various electric components 8 even when the main switch 57 is not manipulated. For example, the main opening-closing circuit 66 includes a parallel path connected in parallel to the main switch 57 and the tether switch 29. On this parallel path is disposed a relay (switching element) 74 for operator-absent manipulation. This relay 74 is electrically connected to the operator-absent control unit 7 and acts to open and close the circuit in response to commands from the operator-absent control unit 7. Thus, the electric power supply device 14 can supply electric power to the various electric components 8 under control of the operator-absent control unit 7. The relay 74 for operator-absent manipulation may be embodied, for example, by a magnetic relay element or a semiconductor element.

The operator-absent control unit 7 is configured to provide an operation signal to the starter opening-closing circuit 68. Specifically, the operator-absent control unit 7 is configured to provide a signal to the starter relay 67 such that the starter relay 67 operates to close the starter opening-closing circuit 68. Thus, the operator-absent control unit 7 can enable supply of electric power to the starter coil 73 even when the starter switch 58 is not manipulated. For example, the starter opening-closing circuit 68 includes a switching circuit that generates an electric current for driving of the starter motor in response to a signal from the starter switch 58. This switching circuit, together with the starter switch 58, is connected to the operator-absent control unit 7. Thus, the switching circuit generates an electric current for driving of the starter based on a signal provided from either the starter switch 58 or the control device 400.

As described above, the operator-absent control unit 7 is configured to enable supply of electric power to the various electric components 8 independently of manipulation of the main switch 57 by the operator. Specifically, in the operator-absent manipulation mode, the operator-absent control unit 7 can provide an operator-absent activation command to the main opening-closing circuit 66 to close the main circuit 65, thereby bringing the main circuit 65 into a closed state and allowing the electric power supply device 14 to begin to supply electric power to the various electric components 8. Further, in the operator-absent manipulation mode, the operator-absent control unit 7 can provide an operator-absent activation command to the starter relay 67 to close the starter relay 67, thereby allowing the starter relay 67 to close the starter opening-closing circuit 68 and allowing the starter motor 61 to be driven to start the engine.

When the operator-absent manipulation mode process of step S3 is executed, the operator-absent control unit 7 can provide a signal to the electric power supply device 14 to close the main circuit 65. Thus, the operator-absent control unit 7 can allow the electric power supply device 14 to begin to supply electric power to the various electric components 8 that perform the operator-absent manipulation mode process even if the main circuit 65 has been open before execution of the operator-absent manipulation mode process. Further, even if the engine has been at rest before execution of the operator-absent manipulation mode process, the operator-absent control unit 7 can provide a signal to the electric power supply device 14 to close the starter relay 67, thereby allowing the electric power supply device 14 to begin to supply electric power to the starter motor 61 and allowing the engine to start.

Figure 5:
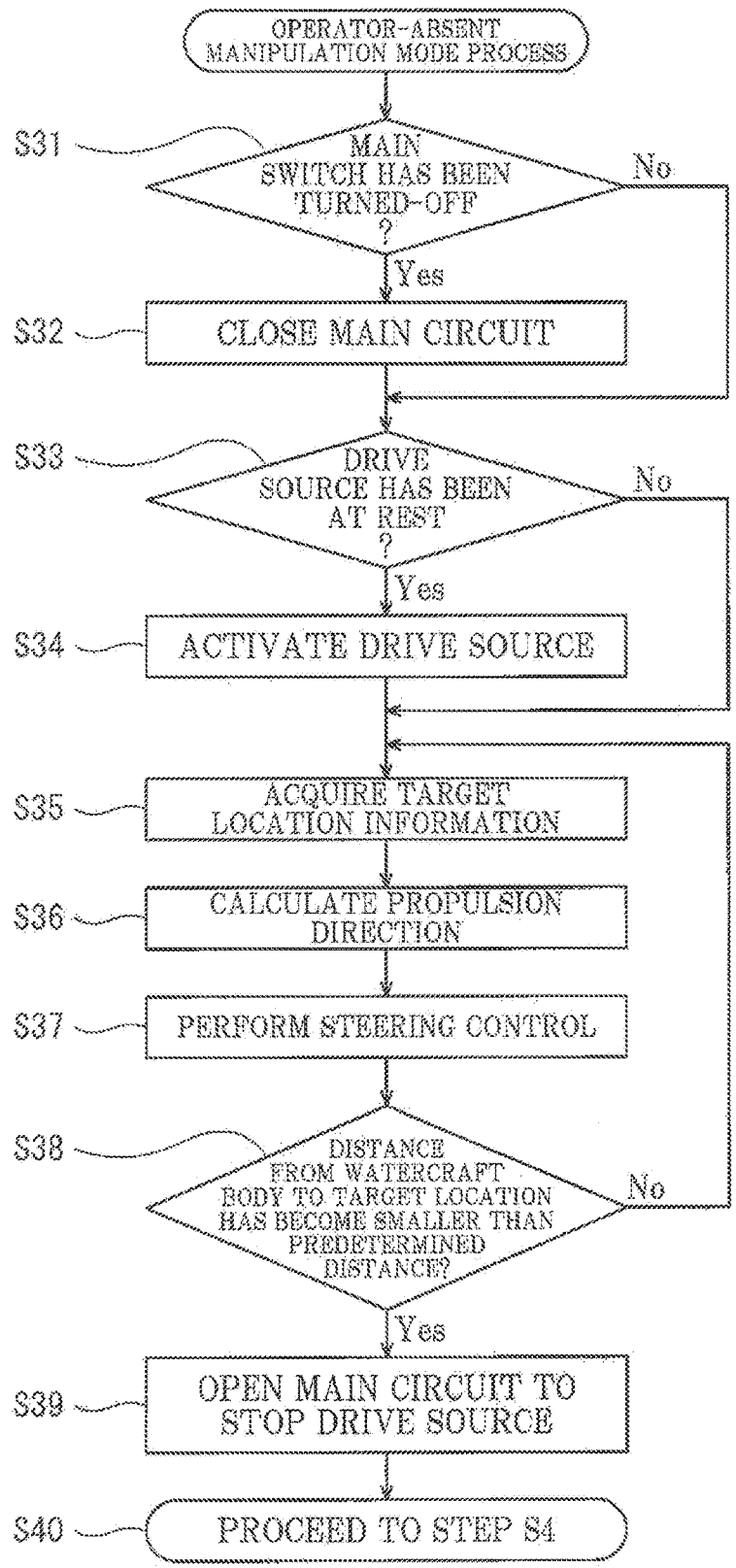
FIG. 5 is a sub-flowchart illustrating an operator-absent manipulation mode process of an exemplary embodiment.

FIG. 5 is a sub-flowchart illustrating the operator-absent manipulation mode process of an exemplary embodiment. In the operator-absent manipulation mode process, the control device 400 generates an operator-absent manipulation command based on an output from the manipulation information acquisition device 110 mounted on the watercraft body 100. The control device 400 moves the watercraft body 100 based on the operator-absent manipulation command.

Specifically, first, the control device 400 proceeds from step S1 shown in FIG. 3 to step S3 shown in FIG. 3, and performs the operator-absent manipulation mode switching determination process. In this process, as shown in FIG. 5, the control device 400 determines whether the main switch 57 has been turned off (step S31). Upon determining in step S31 that the main switch 57 has not been turned off (step S31: No), the control device 400 proceeds to step S33. Upon determining in step S31 that the main switch 57 has been turned off (step S31: Yes), the control device 400 performs control to close the main circuit 65 (step S32) and then proceeds to step S33.

In step S33, the control device 400 determines whether the drive source 18 is at rest. Upon determining in step S33 that the drive source 18 is not at rest (step S33: No), the control device 400 proceeds to step S35. Upon determining in step S33 that the drive source 18 is at rest (step S33: Yes), the control device 400 performs control to activate the drive source 18 (step S34) and then proceeds to step S35.

Next, the control device 400 acquires information about a target location P2 (this information may be referred to as "target location information" hereinafter) from a given target location information acquisition device (step S35). After that, the control device 400 calculates a propulsion direction in which the watercraft body 100 is to be propelled based on the target location information acquired through the target location information acquisition device (step S36), and controls steering of the watercraft body 100 based on the result of the calculation (step S37). In this manner, the control device 400 operates the watercraft body 100 based on the target location information acquired through the target location information acquisition device.

Next, the control device 400 determines whether the watercraft body 100 has approached the target location to such an extent that the distance to the target location is smaller than a predetermined distance (step S38). In step S38, for example, the control device 400 acquires from the GPS device 71 information about a watercraft body location P1 which is a coordinate location of the watercraft body 100, and determines whether a distance D between the watercraft body location P1 of the watercraft body 100 and the target location P2 ($D=|P1-P2|$) has become equal to or smaller than a predetermined reference distance Ds. The reference distance Ds is preferably presettable by an operator's input.

Upon determining in step S38 that the distance D ($D=|P1-P2|$) has not become equal to or smaller than the reference distance Ds (step S38: No), the control device 400 returns to step S35 and maintains the operator-absent manipulation mode. Upon determining in step S38 that the distance D has become equal to or smaller than the reference distance Ds ($|P1-P2|\leq Ds$; step S38: Yes), the control device 400 proceeds to step S39.

In step S39, the control device 400 opens the main circuit 65 to stop the drive source 18. Thus, the operator-absent manipulation mode process of step S3 ends. After that, the control device 400 proceeds to step S4 (step S40).

The target location P2 is set as the target location to which the small watercraft 2 is to be moved in the operator-absent manipulation mode. The target location P2 is, for example, a location input by the operator as desired. The target location P2 is, for example, any one of the following locations: the location of the operator; a stop location where the watercraft body 100 was located when a watercraft body stopping command was input through a watercraft body stopping manipulation member such as a brake device of the small watercraft 2 (this stop location is, for example, a fixed coordinate point representing the location where the watercraft body 100 is moored or in harbor); and the location where the operator became absent from the watercraft body 100 which was being propelled. Alternatively, as described below, the target location P2 may be, for example, a moving coordinate point representing the location of the operator during a period of time in which the operator, who had been on board the small watercraft 2, is absent from the watercraft body 100.

For example, before the mode of the small watercraft 2 is switched from the watercraft body manipulation mode to the operator-absent manipulation mode, the coordinates of the target location P2 are taught to the control device 400 by the operator. For example, the operator inputs to the control device 400 location information indicating the given mooring location where the small watercraft 2 is moored. The control device 400 stores the location indicated by the input location information as the target location P2. The target location P2 is stored, for example, in a storage section (a storage section 702 described later) of the control device 400. The target location P2 stored in the storage section of the control device 400 may be a location where the watercraft body 100 was located when the control device 400 determined that the operator performed a mooring manipulation on the small watercraft 2. In this case, for example, if it is determined by means such as the GPS device 71 that the small watercraft 2 remains at rest on water after a lapse of a predetermined time from the moment when a stopping manipulation was performed through the main switch 57, the control device 400 may regard the stopping manipulation as the mooring manipulation.

For example, the control device 400 may calculate the target location P2 based on information contained in an outboard signal transmitted from the outboard device 3 (which will be described in detail below) and received by the watercraft body communication device 10 while the small watercraft 2 is in the operator-absent manipulation mode. For example, the outboard device 3 is a mobile terminal carried by the operator, and the watercraft body communication device 10 is configured to acquire mobile terminal location information which indicates the location of the mobile terminal and which is transmitted from the mobile terminal. The mobile terminal location information is obtained, for example, by a GPS device included in the mobile terminal. In this case, the control device 400 may set the mobile terminal location information provided from the watercraft body communication device 10 (information indicating the coordinates of the location of the mobile terminal) as the target location P2. In this case, the target location P2 is set as the location where the operator carrying the mobile terminal is situated. Thus, in the operator-absent manipulation mode, the control device 400 operates the watercraft body 100 based on the target location information acquired by the control device 400 itself or outboard device 3 which serves as the target location information acquisition device.

In step S36, for example, the control device 400 performs the calculation of the propulsion direction by calculating a steering direction in which the watercraft body 100 is to be steered so that the bow of the watercraft body 100 is directed to the target location P2. For example, the control device 400 determines a movement route of the watercraft body 100 based on information provided from the manipulation information acquisition device 110. The control device 400 sets the propulsion direction of the watercraft body 100 such that the target location P2 is situated on an extension of the movement route of the watercraft body 100. The control device 400 may, based on information provided from the manipulation information acquisition device 110, set the propulsion direction of the watercraft body 100 such that the bow of the watercraft body 100 is directed to the target location P2.

During the operator-absent manipulation mode, the control device 400 may determine, at a time point other than step S38, whether a predetermined halting condition for halting the operator-absent manipulation mode is satisfied. In this case, for example, when the control device 400 is performing a procedure other than step S38 in the operator-absent manipulation mode, the control device 400 may determine at predetermined time points whether the halting condition for halting the operator-absent manipulation mode is satisfied. Upon determining that the halting condition for halting the operator-absent manipulation mode is satisfied, the control device 400 may, for example, execute a halting operation for halting the operator-absent manipulation mode without waiting for the completion of the other procedure. In a specific example of the halting operation, the control device 400 opens the main circuit 65 to stop the engine and switches the mode of the small watercraft 2 to the watercraft body manipulation mode. Upon determining that the halting condition for halting the operator-absent manipulation mode is not satisfied, the control device 400 maintains the operator-absent manipulation mode and continues executing the other procedure.

The halting condition for halting the operator-absent manipulation mode may include at least one of the conditions mentioned as examples hereinafter. One example of the halting condition is that a halting command to halt the operator-absent manipulation mode (outboard stopping command) has been provided to the control device 400 from the outboard device 3 through the watercraft body communication device 10 because of the presence of an obstacle close to the watercraft body 100 or for any other reason. With this halting condition, the control device 400 can execute the halting operation based on an outboard signal (halting signal). The control device 400 stops the operation of the watercraft body 100 based on the outboard stopping command contained in the outboard signal.

Another example of the halting condition is that the operator has approached the watercraft body 100. With this halting condition, the control device 400 can execute the halting operation for halting the operator-absent manipulation mode based on the detection of the operator's approaching to or boarding on the watercraft body 100 by the operator's absence information acquisition sensor 17. Still another example of the halting condition is that the obstacle detection sensor 12 has detected an obstacle located in front of the watercraft body 100 in the movement direction of the watercraft body 100 or located in the surroundings of the watercraft body 100.

As shown in FIG. 2, the small watercraft system 1 of an exemplary embodiment includes, in addition to the small watercraft 2, the outboard device 3 capable of communicating with the watercraft body communication device 10 of the small watercraft 2. The outboard device 3 of an exemplary embodiment is configured independently of the small watercraft 2, and manipulatable by the operator who is absent from the watercraft body 100.

For example, the outboard device 3 includes a small housing. The outboard device 3 is configured as a mobile terminal portable by the operator and is placed at a location such that the operator can manipulate the outboard device 3. As shown in FIG. 2, the outboard device 3 includes, for example, a manipulation section 300, a notification section 301, a transmitting/receiving section 302, a location information acquisition section 303, and a processing section 304.

The manipulation section 300 is manipulated by the operator and receives various inputs from the operator. The manipulation section 300 is embodied, for example, by various switches serving as outboard manipulation members. The notification section 301 notifies the operator of predetermined information. The notification section 301 is embodied, for example, by a device that visually notifies the operator of the information, such as by a display or a light-emitting element such as an LED. The notification section 301 may be embodied by a speaker that notifies the operator of the information by means of a sound.

The transmitting/receiving section 302 is configured to wirelessly transmit and receive various signals to and from the watercraft body communication device 10 of the small watercraft 2. The transmitting/receiving section 302 is embodied, for example, by a communication circuit including an antenna. The location information acquisition section 303 is embodied, for example, by a GPS device, and acquires location information indicating the location of the outboard device 3 (information indicating the coordinates of the location of the outboard device 3).

The processing section 304 is embodied, for example, by a processing circuit and executes a stored processing program to control the notification section 301 and the transmitting/receiving section 302 based on information provided from the manipulation section 300, the transmitting/receiving section 302, and the location information acquisition section 303. Specifically, the processing section 304 generates commands to be provided to the small watercraft 2 and transmits the commands to the watercraft body communication device 10 of the small watercraft 2 through the transmitting/receiving section 302. The commands are transmitted to the control device 400 through the watercraft body communication device 10. The commands transmitted to the watercraft body communication device 10 by the processing section 304 include a mode switching command to perform switching from the watercraft body manipulation mode to the operator-absent manipulation mode and a halting command to halt the operator-absent manipulation mode.

Figure 6:
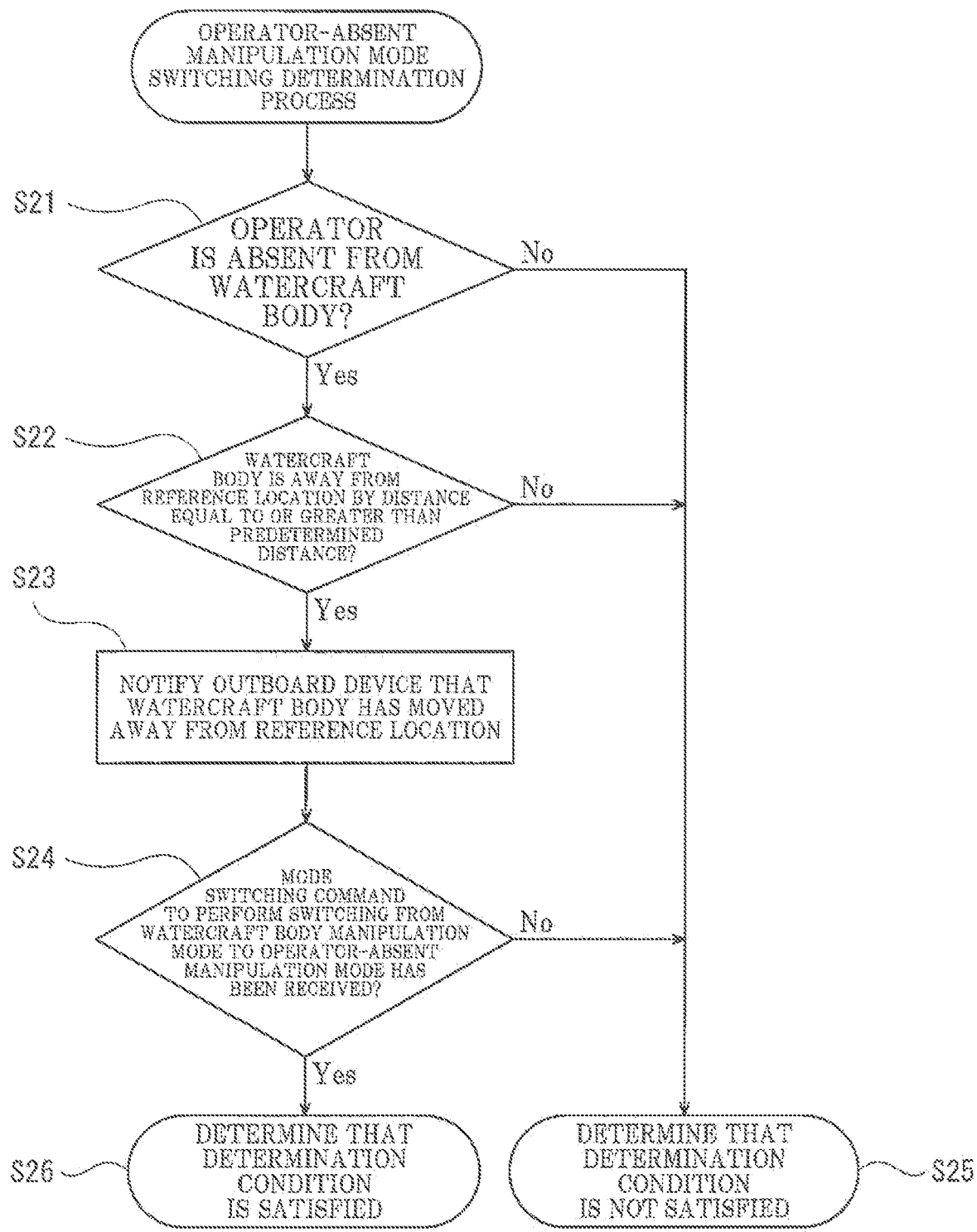
FIG. 6 is a sub-flowchart illustrating an operator-absent manipulation mode switching determination process of an exemplary embodiment.

FIG. 6 is a sub-flowchart illustrating the operator-absent manipulation mode switching determination process of an exemplary embodiment. Illustrated in FIG. 6 is an operator-absent manipulation mode switching determination process performed by the control device 400 of the small watercraft system 1 including the outboard device 3 described above. In this process, only when all of a plurality of requirements included in the mode switching condition are met, the control device 400 determines that the mode switching condition is satisfied, and executes switching from the watercraft body manipulation mode to the operator-absent manipulation mode. That is, if at least one of the plurality of requirements included in the mode switching condition is not met, the control device 400 determines that the mode switching condition is not satisfied, and does not execute the mode switching.

Once a determination time point is reached during execution of the watercraft body manipulation mode (during step S1 of FIG. 3), the control device 400 proceeds to step S2 where, as shown in FIG. 6, the control device 400 determines whether all of the requirements included in the mode switching condition are met. The determination time point repeatedly occurs at predetermined time intervals.

In step S2, as shown in FIG. 6, the control device 400 first determines whether the operator is absent from the watercraft body 100 based on a detection signal provided from the operator's absence information acquisition sensor 17 (step S21). Upon determining in step S21 that the operator is not absent from the watercraft body 100 (step S21: No), the control device 400 determines that the mode switching condition is not satisfied (step S25), then ends this process, and returns to step S1.

Upon determining in step S21 that the operator is absent from the watercraft body 100 (step S21: Yes), the control device 400 proceeds to step S22. In step S22, the control device 400 determines whether the watercraft body 100 is away from a predetermined reference location by a distance equal to or greater than a predetermined distance. The reference location is, for example, the target location P2, and the control device 400 determines whether the distance D between the watercraft body location P1 of the watercraft body 100 and the reference location has exceeded the predetermine reference distance Ds (step S22). The control device 400 can know the location information indicating the reference location with the aid of, for example, the GPS device 71. The control device 400 acquires information indicating the watercraft body location P1 of the watercraft body 100 and information indicating the target location P2 through operations similar to those performed in steps S35 and S38 shown in FIG. 5.

Upon determining in step S22 that the watercraft body 100 is not away from the reference location by a distance equal to or greater than the predetermined distance (step S22: No), the control device 400 proceeds to step S25. Upon determining in step S22 that the watercraft body 100 is away from the reference location by a distance equal to or greater than the predetermined distance (step S22: Yes), the control device proceeds to step S23. In step S23, the control device 400 transmits a moving-away signal to the outboard device 3 through the watercraft body communication device 10. The moving-away signal is a signal indicating that the watercraft body 100 has moved away from the reference location by a distance equal to or greater than the predetermined distance. The outboard device 3 transmits to the control device 400 a response signal indicating the reception of the moving-away signal. Upon receiving the response signal from the outboard device 3, the control device 400 proceeds to step S24. If the control device 400 does not receive the response signal from the outboard device 3, the control device 400 repeats step S23 and repeatedly transmits the moving-away signal for a predetermined period of time.

Once the processing section 304 of the outboard device 3 receives the moving-away signal transmitted from the control device 400, the processing section 304 causes the notification section 301 to give the operator a notification indicating that the watercraft body 100 has moved away from the reference location by a distance equal to or greater than the predetermined distance. Through this notification, the operator carrying the outboard device 3 can know that the watercraft body 100 has moved away from the reference location by a distance equal to or greater than the predetermined distance. When wanting to operate the small watercraft 2 in the operator-absent manipulation mode, the operator manipulates the manipulation section 300 to request the control device 400 to perform mode switching from the watercraft body manipulation mode to the operator-absent manipulation mode. Once the request for mode switching from the watercraft body manipulation mode to the operator-absent manipulation mode is provided to the processing section 304 of the outboard device 3 from the operator through the manipulation section 300, the processing section 304 causes the transmitting/receiving section 302 to transmit to the control device 400 a mode switching command to switch the small watercraft 2 from the watercraft body manipulation mode to the operator-absent manipulation mode.

In step S24, the control device 400 determines whether the watercraft body communication device 10 has received the mode switching command to perform switching from the watercraft body manipulation mode to the operator-absent manipulation mode (step S24). Upon determining in step S24 that the mode switching command to perform switching from the watercraft body manipulation mode to the operator-absent manipulation mode has not been received (step S24: No), the control device 400 proceeds to step S25. Upon determining in step S24 that the mode switching command to perform switching from the watercraft body manipulation mode to the operator-absent manipulation mode has been received (step S24: Yes), the control device 400 proceeds to step S26 and determines that the determination condition is satisfied. After that, the control device 400 ends this process and proceeds to step S3 shown in FIG. 3.

In step S25, the control device 400 determines that the determination condition is not satisfied. After that, the control device 400 ends this process, returns to step S1 shown in FIG. 3, and keeps the small watercraft 2 in the watercraft body manipulation mode. If the control device 400 repeatedly returns to step S1 from step S25, the control device 400 may proceed from step S1 to step S2 at predetermined time intervals.

As described above, the mode switching condition of an exemplary embodiment includes conditions other than the condition that the operator is absent from the watercraft body 100, and the other conditions include, for example, the condition that the distance D has exceeded the reference distance Ds and the condition that the mode switching command has been received from the outboard device 3. Thus, the watercraft body 100 can be moved also when the watercraft body 100 is away from the reference location by a distance equal to or greater than a predetermined distance. Additionally, the mode of the small watercraft 2 can be prevented from accidentally switching from the watercraft body manipulation mode to the operator-absent manipulation mode when the control device 400 has not received the mode switching command. Thus, the operator manipulating the outboard device 3 can determine at his/her discretion whether to execute the operator-absent manipulation mode. At least one of steps S22 to S24 may be skipped where appropriate.

The outboard device 3 of an exemplary embodiment may be configured to, based on a manipulation performed by the operator carrying the outboard device 3, transmit to the control device 400 a mode switching command (halting command) to switch the mode of the small watercraft 2 from the operator-absent manipulation mode to the watercraft body manipulation mode. In this case, for example, the control device 400 may determine at a predetermined time point whether the mode switching command has been received from the outboard device 3. Upon determining that the mode switching command (halting command) has been received from the outboard device 3, the control device 400 may perform control to stop the drive source 18.

Further, in the small watercraft system 1 including the outboard device 3, the control device 400 operates to close the main circuit 65 (step S32) when performing mode switching from the watercraft body manipulation mode to the operator-absent manipulation mode. Additionally, in the operator-absent manipulation mode process, the control device 400 may further perform the step of, upon determining that the watercraft body 100 has approached the target location P2 to such an extent that the distance to the target location P2 is smaller than a predetermined distance (step S38: Yes), transmitting an approaching signal indicating this determination result to the outboard device 3 through the watercraft body communication device 10. In this case, the processing section 304 of the outboard device 3 may, upon receiving the approaching signal from the control device 400, cause the notification section 301 to give the operator a notification indicating that the watercraft body 100 has approached the target location P2. Through this notification, the operator carrying the outboard device 3 can know that the watercraft body 100 has approached the target location P2.

In an exemplary embodiment, when the mode of the small watercraft 2 is switched from the operator-absent manipulation mode to the watercraft body manipulation mode, the control device 400 controls the electric power supply device 14 to open the main circuit 65 and stop the drive source 18 (step S39). The control device 400 may be configured to maintain the driving state of the drive source 18 (e.g., an engine running state) when the mode of the small watercraft 2 is switched from the operator-absent manipulation mode to the watercraft body manipulation mode. In this case, the control device 400 operates to maintain the driving state of the drive source 18 without opening the main circuit 65 even after the small watercraft 2 is returned from the operator-absent manipulation mode to the watercraft body manipulation mode.

As described above, in the method of controlling the small watercraft 2 according to an exemplary embodiment, the operator-absent manipulation mode in which the watercraft body 100 is moved by controlling the drive source 18 and the steering device 6 based on the operator-absent manipulation command independent of the watercraft body manipulation command is executed upon satisfaction of the mode switching condition including the operator's absence condition that the operator is absent from the watercraft body 100. In particular, upon determining that the mode switching condition is satisfied, the control device 400 executes the operator-absent manipulation mode in which the control device 400 moves the watercraft body 100 by controlling the drive source 18 and the steering device 6 based on the operator-absent manipulation command.

The small watercraft system 1 of an exemplary embodiment includes the watercraft body 100, the watercraft body manipulation members 16, the drive source 18, the steering device 6, and the control device 400, and the control device 400 includes a processor. The processor determines whether the mode switching condition is satisfied, and upon determining that the mode switching condition is satisfied, the processor executes the operator-absent manipulation mode in which the processor moves the watercraft body 100 by controlling the drive source 18 and the steering device 6 based on the operator-absent manipulation command.

In the small watercraft system 1, as described above, when the control device 400 determines that the mode switching condition is satisfied, the watercraft body 100 can be moved without the operator on board the watercraft body 100. This can reduce the operator's burden of catching up with the small watercraft 2 which has drifted away on water. Thus, the present embodiment can reduce the burden imposed on the operator in the event of drifting away of the small watercraft 2 on water.

For example, it can be envisaged that the operator on board the watercraft body 100, who has maneuvered the watercraft body 100 in the watercraft body manipulation mode, brings the watercraft body 100 close to a pier, a lakeshore, or a seashore and stops the small watercraft. For this case, it can be envisaged that the watercraft body 100 moored at a given location with means such as a mooring line is unmoored for some reason and drifts on water away from the operator due to external factors such as winds and waves. According to an exemplary embodiment, in the event of such drifting away, the watercraft body 100 can be brought close to the operator by operating the watercraft body 100 in the operator-absent manipulation mode.

The small watercraft system 1 further includes the starter relay 67 as a connection device connecting the drive source 18 to the control device 400. If the drive source 18 is an internal combustion engine and the internal combustion engine is at rest at the beginning of execution of the operator-absent manipulation mode by the control device 400, the control device 400 controls the starter relay 67 to start the internal combustion engine. Thus, for example, in the event that the internal combustion engine has been at rest during drifting away of the watercraft body 100, the control device 400 can operate to start the internal combustion engine and enable the watercraft body 100 to be moved in the operator-absent manipulation mode.

In the operator-absent manipulation mode of an exemplary embodiment, the control device 400 moves the watercraft body 100 at a lower propulsion power and a lower speed than in the watercraft body manipulation mode in which the watercraft body 100 is operated based on the watercraft body manipulation command. Thus, the watercraft body 100 operated in the operator-absent manipulation mode can be moved at a moderate movement speed.

The small watercraft system 1 of an exemplary embodiment includes the watercraft body communication device 10 that receives an outboard signal transmitted from the outboard device 3 remote from the watercraft body 100 and, in the operator-absent manipulation mode, the control device 400 operates the watercraft body 100 based on the outboard signal received by the watercraft body communication device 10. Thus, for example, even when the operator is absent from the watercraft body 100, the watercraft body 100 can be operated in the operator-absent manipulation mode and moved to the target location P2.

In the operator-absent manipulation mode, the control device 400 stops the operation of the watercraft body 100 based on an outboard stopping command contained in the outboard signal. Thus, even during the operator-absent manipulation mode, the movement of the watercraft body 100 can be halted as necessary. This can improve the user-friendliness of the small watercraft system 1.

In an example, the outboard device 3 is configured to be portable by the operator. In this case, the outboard device 3 can be located close to the operator, and thus the operator can easily manipulate the outboard device 3 at a desired time point.

In an example, the small watercraft system 1 of an exemplary embodiment includes the starter switch 58 serving as the watercraft body activation manipulation member which is mounted on the watercraft body 100 and through which a watercraft body activation command is input by the operator. In the operator-absent manipulation mode, the control device 400 controls the electric power supply device 14 and instructs the electric power supply device 14 to supply electric power to the drive source 18 and the steering device 6 based on an operator-absent activation command independent of the watercraft body activation command input through the watercraft body activation manipulation member. Thus, for example, even when the supply of electric power to the drive source 18 and the steering device 6 has been shut off before execution of the operator-absent manipulation mode, the control device 400 can operate to control the drive source 18 and the steering device 6.

In the small watercraft system 1 of an exemplary embodiment, the mode switching condition further includes a condition that a mode switching command contained in the outboard signal received by the watercraft body communication device 10 has been received. Thus, the operator carrying the outboard device 3 can use the outboard device 3 to transmit the outboard signal from a location remote from the watercraft body 100 and control mode switching of the small watercraft 2.

In an example, the mode switching condition further includes a condition that the distance D between the target location P2 set as the reference location and the watercraft body location P1 has exceeded the reference distance Ds. In the operator-absent manipulation mode, the control device 400 generates an operator-absent manipulation command configured to reduce the distance D between the target location P2 and the watercraft body location P1, and moves the watercraft body 100 based on the operator-absent manipulation command. Thus, in the operator-absent manipulation mode, the watercraft body 100 can be properly moved toward the target location P2.

In the operator-absent manipulation mode, the control device 400 operates the watercraft body 100 based on location information which indicates the location of the watercraft body 100 and which is acquired by the manipulation information acquisition device 110 serving as the watercraft body location information acquisition device. Thus, the control device 400 can properly recognize the watercraft body location P1.

In the operator-absent manipulation mode, the control device 400 operates the watercraft body 100 based on target location information acquired by the manipulation information acquisition device 110. Thus, the control device 400 can properly recognize the target location P2.

In an example, the small watercraft system 1 of an exemplary embodiment includes the obstacle detection sensor 12 that detects the presence or absence of an obstacle located in the surroundings of the watercraft body 100, and the mode switching condition further includes a condition that the obstacle detection sensor 12 has not detected any obstacle. In this case, the obstacle detection sensor 12 can be used to prevent the watercraft body 100 moved in the operator-absent manipulation mode from unnecessarily approaching an obstacle.

The small watercraft system 1 may include a plurality of operator's absence information acquisition sensors 17 disposed individually at different locations on the watercraft body 100 to detect the presence or absence of the operator at the different locations on the watercraft body 100. When the small watercraft system 1 does not include the obstacle detection sensor 12, the operator-absent control unit 7 may refer to map information containing location information indicating the locations of obstacles. In this case, for example, in the operator-absent manipulation mode, the operator-absent control unit 7 can recognize the watercraft body location P1 of the watercraft body 100 with the aid of the manipulation information acquisition device 110 and can control the drive source 18 and the steering device 6 in such a manner as to prevent the watercraft body location P1 from approaching an obstacle's location known from the map information stored in the storage section 702. The alerting device 76 and the notification section 301 are not essential and may be omitted.

In an exemplary embodiment, the operator carrying the outboard device 3 gets on board the small watercraft 2. The outboard device 3 of an exemplary embodiment is, for example, removably attached to an arm of the operator. The outboard device 3 of an exemplary embodiment is, for example, in the form of a band. The outboard device 3 may have any other form attachable to the body of the operator and may be in the form of a tag. Attaching such a form of outboard device 3 to the body of the operator reduces the likelihood that the outboard device 3 is separated away from the operator.

Figure 7:
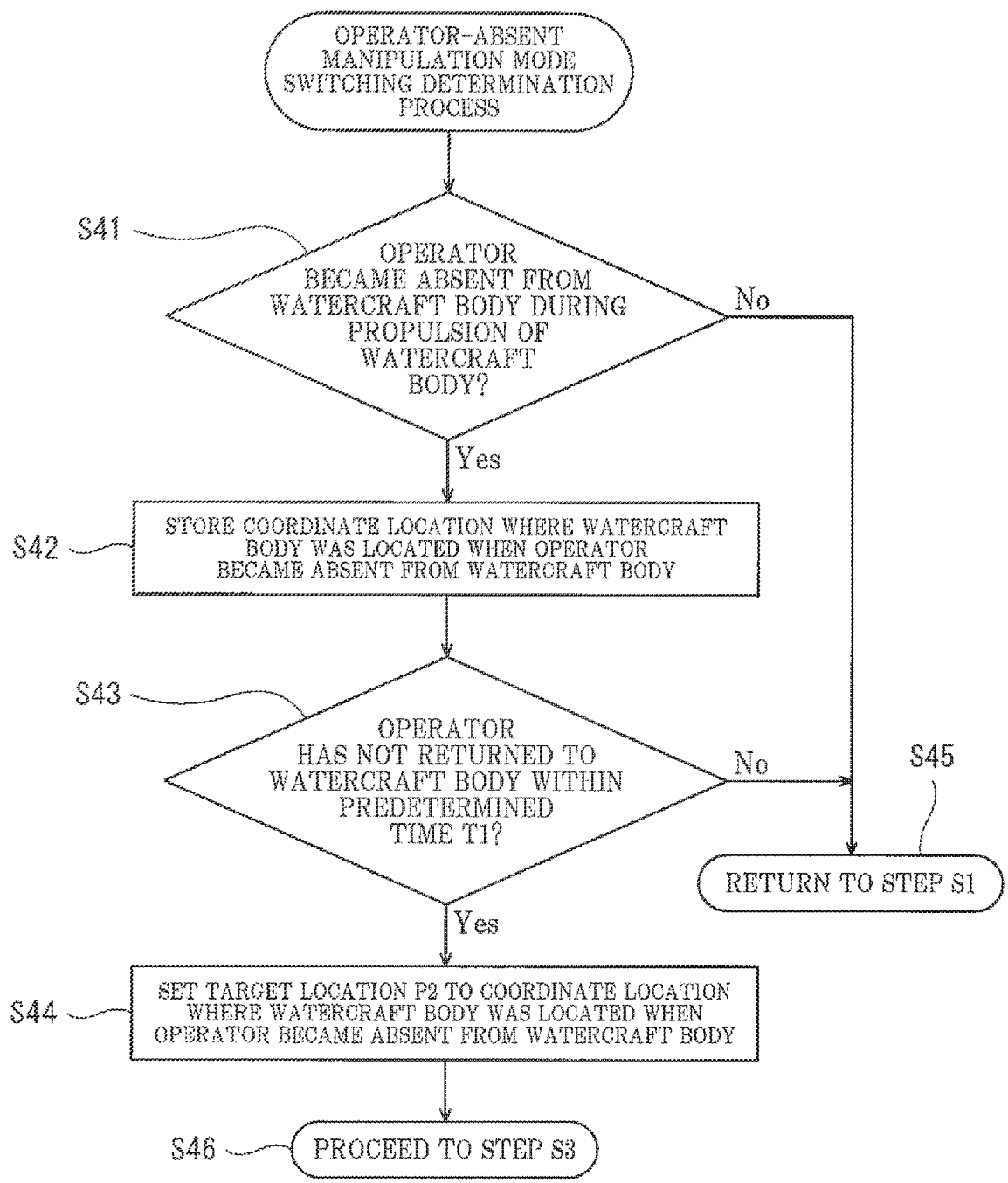
FIG. 7 is a sub-flowchart illustrating an operator-absent manipulation mode switching determination process according to an exemplary embodiment.

FIG. 7 is a sub-flowchart illustrating an operator-absent mode switching determination process according to an exemplary embodiment. In an exemplary embodiment, the reference location used for determining whether the mode switching condition is satisfied is a location where the operator became absent from the watercraft body 100 which was being propelled.

Specifically, first, the control device 400 determines whether the operator, who had been on board the watercraft body 100, became absent from the watercraft body 100 during propulsion of the watercraft body 100 in the watercraft body manipulation mode (step S41). In step S41, for example, the control device 400 determines whether the operator became absent from the watercraft body 100 with the aid of the operator's absence information acquisition sensor 17.

Upon determining in step S41 that the operator has not become absent from the watercraft body 100 (step S41: No), the control device 400 proceeds to step S45 and returns to step S1. Upon determining in step S41 that the operator became absent from the watercraft body 100 (step S41: Yes), the control device 400 stores into the storage section 702 the coordinate location where the watercraft body 100 was located when the determination was made, namely when the operator became absent from the watercraft body 100 (step S42).

After step S42, the control device 400 determines whether the operator has not returned to the watercraft body 100 within a predetermined time T 1 after the control device 400 determined in step S41 that the operator became absent from the watercraft body 100 (step S43). The time T 1 can be predetermined as desired.

Upon determining in step S43 that the operator has returned to the watercraft body 100 within the predetermined time T1 (step S43: No), the control device 400 deletes the information which indicates the coordinate location of the watercraft body 100 and which was stored into the storage section 702 in step S42, and then proceeds to step S45. Upon determining in step S43 that the operator has not returned to the watercraft body 100 within the predetermined time T1 (step S43: Yes), the control device 400 sets the target location P2 to the coordinate location of the watercraft body 100 which was stored into the storage section 702 in step S42 (step S44), and proceeds to step S46 and then to step S3.

According to the an exemplary embodiment described above, in the event that a certain time has elapsed after the operator became absent from the watercraft body 100 for some reason, the operator-absent manipulation mode can be executed to move the watercraft body 100 toward the location where the watercraft body 100 was located when the operator became absent from the watercraft body 100.

In an exemplary embodiment, for example, the control device 400 may perform control to stop the drive source 18 between step S43 and step S46. In this case, steps S33 and S34 may be skipped.

In an exemplary embodiment, the target location P2 may be a location other than the coordinate location of the watercraft body 100 (the coordinate location where the watercraft body 100 was located when the operator became absent from the watercraft body 100). For example, the control device 400 may set the target location P2 to the operator's location indicated by location information acquired by the location information acquisition section 303 of the outboard device 3 carried by the operator. In this case, for example, the outboard device 3 causes the transmitting/receiving section 302 to transmit to the watercraft body communication device 10 the location information acquired by the location information acquisition section 303 as well as a mode switching command to perform switching from the watercraft body manipulation mode to the operator-absent manipulation mode. The control device 400 receives from the outboard device 3 the mode switching command to perform switching to the operator-absent manipulation mode, and stores into the storage section 702 location information which indicates the location of the outboard device 3 and which is contained in information transmitted from the outboard device 3. The control device 400 sets this location information as the target location P2. Thus, in the event that the operator is absent from the watercraft body 100 for some reason and that a certain time (e.g., the predetermined time T1) has elapsed after the control device 400 detected the operator's absence in step S41, the control device 400 can execute the operator-absent manipulation mode to direct the watercraft body 100 toward the operator (outboard device 3).

After transmitting the mode switching command to perform switching from the watercraft body manipulation mode to the operator-absent manipulation mode, the outboard device 3 may cause the transmitting/receiving section 302 to transmit the location information of the outboard device 3 to the watercraft body communication device 10 at predetermined time intervals. In this case, the control device 400 may update the target location P2 based on the location information transmitted from the outboard device 3 to the watercraft body communication device 10 at each time interval.

A small watercraft system according to an exemplary embodiment includes the small watercraft 2 and the outboard device 3 manipulated by the operator located outside the watercraft. The manipulation section 300 of the outboard device 3 of an exemplary embodiment is configured to allow the operator to input a propulsion power and a steering direction of the watercraft body 100. In the operator-absent manipulation mode, the control device 400 steers the watercraft body 100 based on an outboard steering command contained in an outboard signal transmitted from the outboard device 3. Thus, the above exemplary embodiment differs from the other embodiments in that in the operator-absent manipulation mode, the operator located outside the watercraft manipulates the watercraft body 100 by the outboard device 3.

Figure 8:
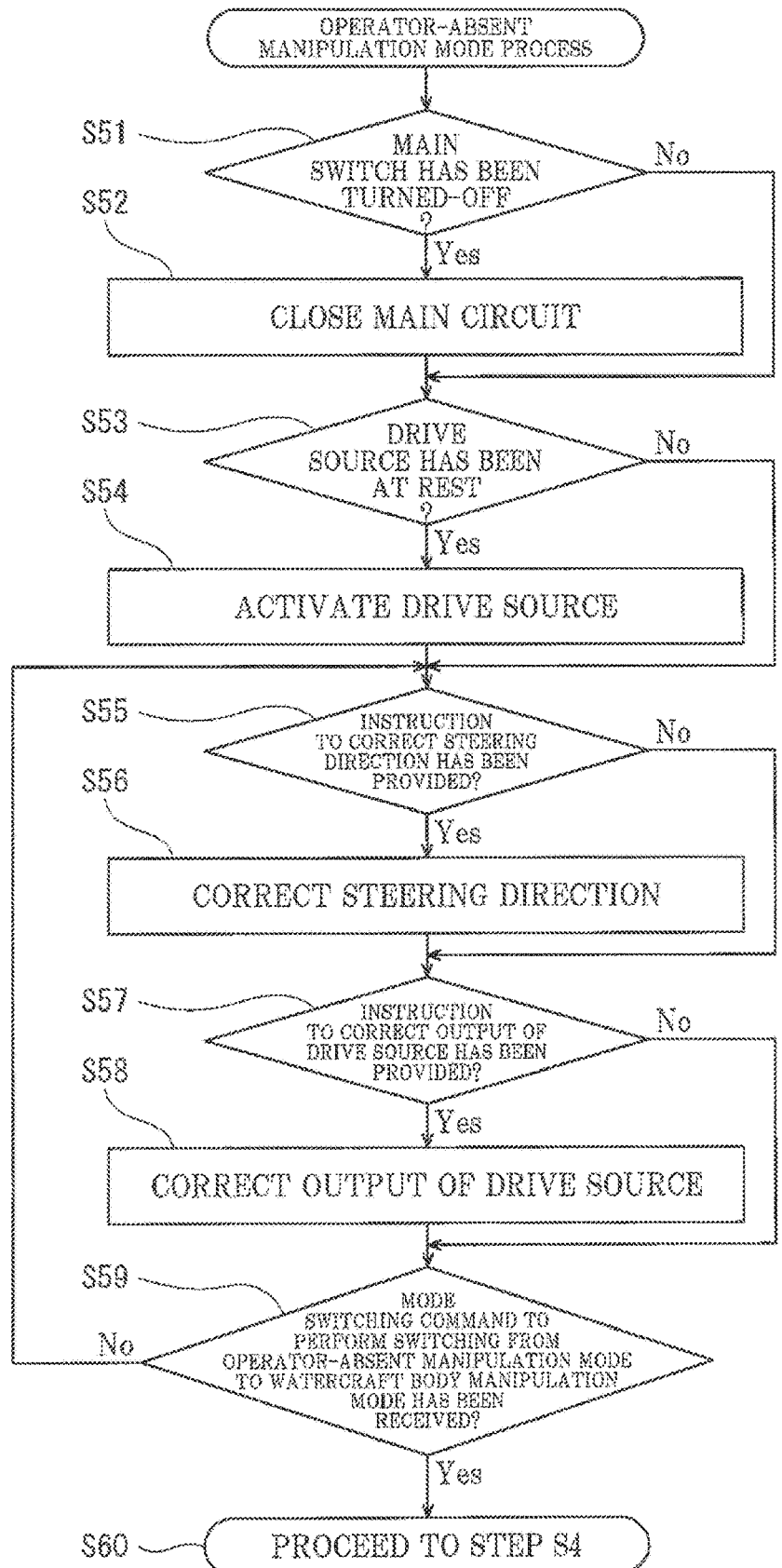
FIG. 8 is a sub-flowchart illustrating an operator-absent manipulation mode control process of a small watercraft system according to an exemplary embodiment.

FIG. 8 is a sub-flowchart illustrating an operator-absent manipulation mode control process executed in the small watercraft system according to an exemplary embodiment. In this process, as shown in FIG. 8, the control device 400 first performs steps S51 to S54 in the same manner as the control device performs steps S31 to S34.

After that, the control device 400 determines whether a manipulation command provided from the outboard device 3 contains an instruction to correct the steering direction (step S55). Upon determining in step S55 that the manipulation command does not contain the instruction to correct the steering direction (step S55: No), the control device 400 proceeds to step S57. Upon determining in step S55 that the manipulation command contains the instruction to correct the steering direction (step S55: Yes), the control device 400 corrects the steering direction based on the instruction (step S56) and then proceeds to step S57.

In step S57, the control device 400 determines whether the manipulation command contains an instruction to correct the output of the drive source 18 (step S57). Upon determining in step S57 that the manipulation command does not contain the instruction to correct the output of the drive source 18 (step S57: No), the control device 400 proceeds to step S59. Upon determining in step S57 that the manipulation command contains the instruction to correct the output of the drive source 18 (step S57: Yes), the control device 400 corrects the output of the drive source 18 based on the instruction (step S58), and proceeds to step S59.

Next, in step S59, the control device 400 determines whether a mode switching command to perform switching from the operator-absent manipulation mode to the watercraft body manipulation mode has been received. Upon determining in step S59 that the mode switching command to perform switching from the operator-absent manipulation mode to the watercraft body manipulation mode has not been received (step S59: No), the control device 400 returns to step S55. Upon determining in step S59 that the mode switching command to perform switching from the operator-absent manipulation mode to the watercraft body manipulation mode has been received (step S59: Yes), the control device 400 proceeds to step S4 (step S60). Thus, this process ends. In this example, the control device 400 determines in step S4 that the mode switching condition for switching from the operator-absent manipulation mode to the watercraft body manipulation mode is satisfied (step S4: Yes).

This exemplary embodiment provides the same or similar advantages as the exemplary embodiments described above. Additionally, since the operator can manipulate the drive source 18 and the steering device 6 using the outboard device 3, the operator carrying the outboard device 3 can, for example, finely adjust the operation of the watercraft body 100 in view of the surroundings of the watercraft body 100. The manipulation section 300 may be configured, for example, to allow the operator to input only a steering direction. In this case, in the operator-absent manipulation mode, the control device 400 may set the propulsion power of the watercraft body 100 to a predetermined level such that the watercraft body 100 moves at a slow speed.

Figure 9:
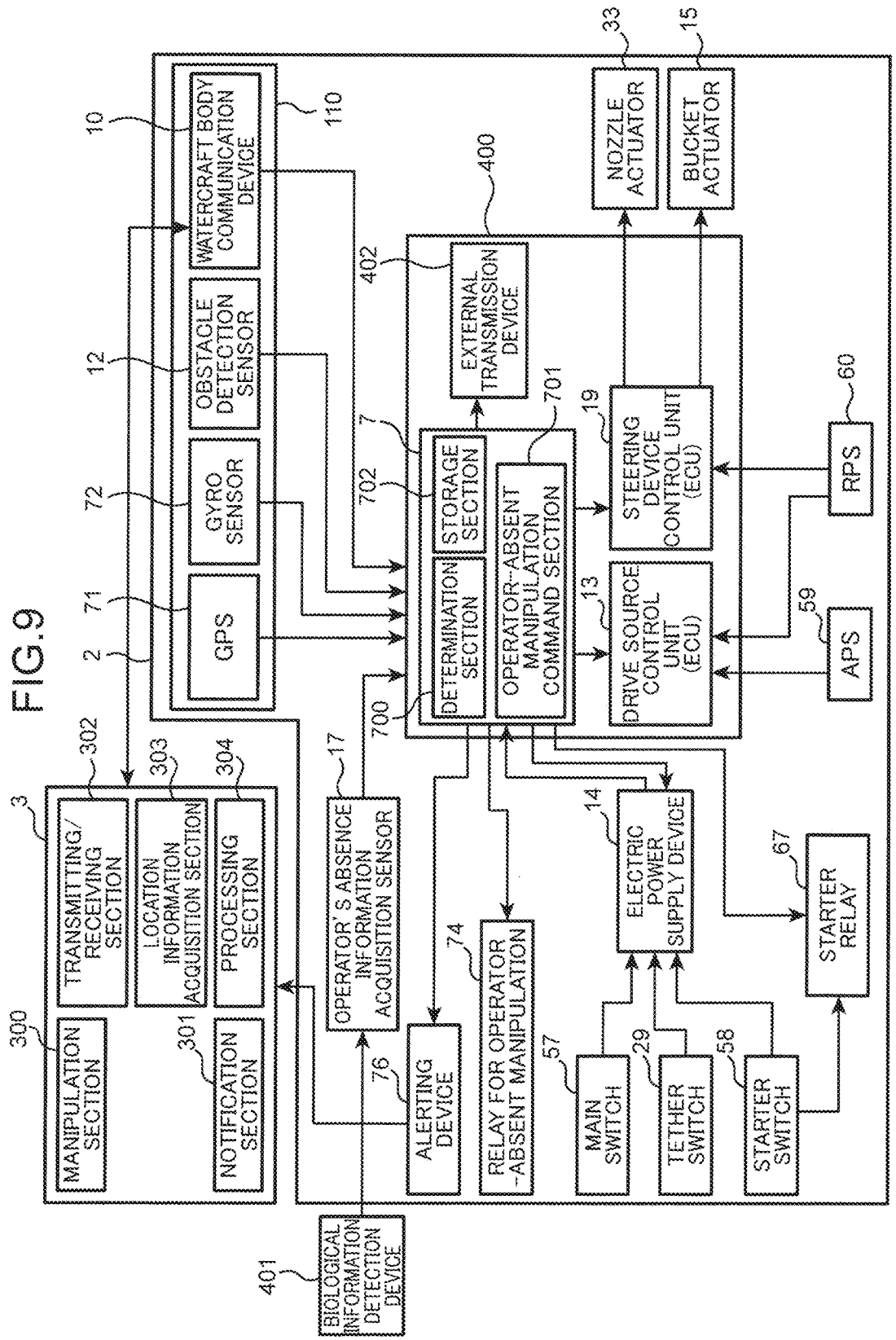
FIG. 9 is a signal diagram of a small watercraft system of an exemplary embodiment.

FIG. 9 is a signal diagram of a small watercraft system according to an exemplary embodiment. In FIG. 9 and the following description, the same elements as those of the above-described exemplary embodiments are denoted by the same reference numerals as those of these exemplary embodiments.

Figure 10:
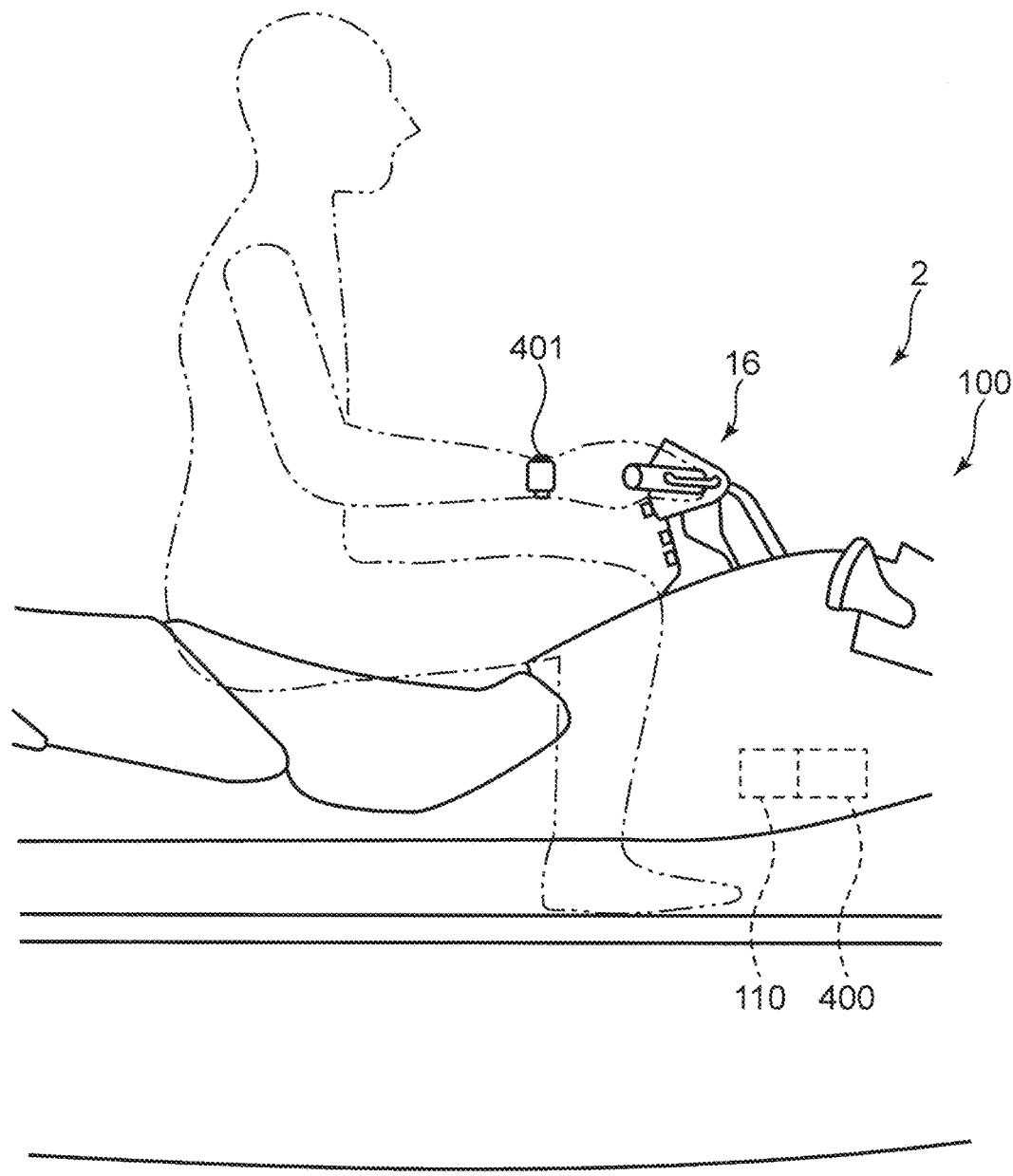
FIG. 10 is a view corresponding to the partially enlarged view of FIG. 1, and is a view for describing a biological information detection device.

In the small watercraft system according to the exemplary embodiment, the operator's absence information acquisition sensor 17 can receive a radio wave transmitted from a biological information detection device 401 illustrated in FIG. 10 to external entities. The determination section 700 of the control device 400 can perform operator-absent manipulation mode switching determination for determining whether a mode switching condition for switching the mode of the small watercraft 2 from the watercraft body manipulation mode to the operator-absent manipulation mode is satisfied based on the state of the radio wave of the biological information detection device 401 received by the operator's absence information acquisition sensor 17. Specifically, the operator's absence information acquisition sensor 17 detects the signal intensity of the radio wave transmitted from the biological information detection device 401. The control device 400 can perform the operator-absent manipulation mode switching determination based on the signal intensity. This control device 400 corresponds to the "controller" in the present disclosure.

The biological information detection device 401 is a device capable of being carried by the user and detecting biological information of the user in a state of being attached to the body of the user. The biological information detection device 401 detects pulse, respiratory rate, blood oxygen level, and the like of the user as biological information. The biological information detection device 401 is configured to be capable of transmitting a predetermined radio wave to external entities as described above. This biological information detection device 401 corresponds to the "portable equipment" in the present disclosure. The biological information detection device 401 detects the biometric information of the operator and transmits the radio wave from the vicinity of the operator while being carried and attached by the operator.

In the small watercraft system according to the exemplary embodiment, the control device 400 includes an external transmission device 402.

The external transmission device 402 is a device that wirelessly transmits a signal to external entities of the small watercraft 2. For example, the external transmission device 402 is wirelessly connected to a network N such as the Internet through a public circuit via a base station antenna that is a fixed facility. Thus, the external transmission device 402 is wirelessly connected to a server via the network N, and transmits information on the small watercraft 2 to the server. The server is further wirelessly connected to a plurality of computers or the like, and the information on the small watercraft 2 transmitted to the server is transmitted to another computer or the like via the network N.

Also in the small watercraft system according to the exemplary embodiment illustrated in FIG. 9, the control device 400 performs the operation illustrated in the flowchart of FIG. 3.

Specifically, the control device 400 sets the mode of the small watercraft 2 to the watercraft body manipulation mode (step S1). As described above, in the watercraft body manipulation mode, the control device 400 enables the watercraft body 100 to be controlled based on watercraft body manipulation commands which are input by the operator through the watercraft body manipulation members 16. The control device 400 determines whether a mode switching condition for switching the mode of the small watercraft 2 from the watercraft body manipulation mode to the operator-absent manipulation mode is satisfied (step S2). Upon determining that the mode switching condition is satisfied (step S2: Yes), the control device 400 executes the operator-absent manipulation mode process to control the watercraft body 100 to move in the operator-absent manipulation mode (step S3). As described above, in the operator-absent manipulation mode, the control device 400 generates operator absent manipulation commands independent of manipulation inputs provided through the watercraft body manipulation members 16. The control device 400 determines whether the mode switching condition for switching the mode of the small watercraft 2 from the operator-absent manipulation mode to the watercraft body manipulation mode is satisfied (step S4). Upon determining that the mode switching condition for switching from the operator-absent manipulation mode to the watercraft body manipulation mode is not satisfied (step S4: No), the control device 400 returns to step S3. On the other hand, upon determining that the mode switching condition for switching from the operator-absent manipulation mode to the watercraft body manipulation mode is satisfied (step S4: Yes), the control device 400 returns to step S1. The above-described the watercraft body manipulation members 16 corresponds to the "the watercraft body manipulation structure" in the present disclosure.

However, the above-described exemplary embodiment illustrated in FIG. 2 and the exemplary embodiment illustrated in FIG. 9 are different from each other in specific content of the operator-absent manipulation mode process (step S3). The above-described exemplary embodiment illustrated in FIG. 2 and the exemplary embodiment illustrated in FIG. 9 are different from each other in specific content of the operator-absent manipulation mode switching determination process, that is, the process (step S2) of determining whether the mode switching condition for switching the mode of the small watercraft 2 from the operator-absent manipulation mode to the watercraft body manipulation mode is satisfied.

Figure 11:
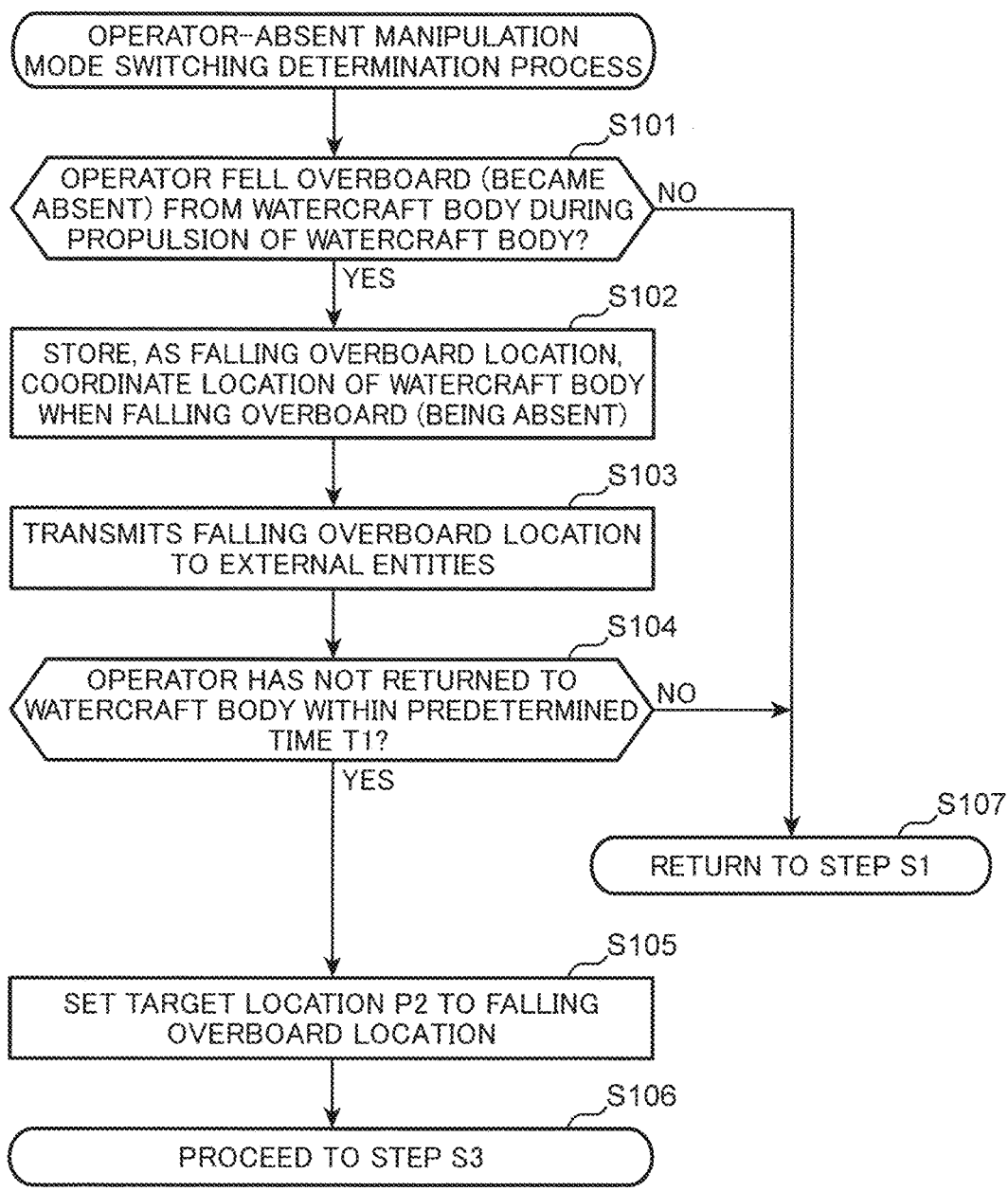
FIG. 11 is a sub-flowchart illustrating an operator-absent manipulation mode switching determination process according to an exemplary embodiment.

FIG. 11 is a view corresponding to FIG. 7, and is a sub-flowchart illustrating the operator-absent manipulation mode switching determination process according to the exemplary embodiment illustrated in FIG. 9.

When the operator-absent manipulation mode switching determination process is started, the control device 400 determines whether the operator became absent from the watercraft body 100 during propulsion of the watercraft body 100 in the watercraft body manipulation mode (step S101). This determination is performed based on a result of detection of the operator's absence information acquisition sensor 17, similarly to the above-described exemplary embodiments. Here, during propulsion of the watercraft body 100 in the watercraft body manipulation mode means when the watercraft body 100 is being propelled over water based on the manipulation by the operator. Thus, the operator being absent from the watercraft body 100 during propulsion of the watercraft body 100 in the watercraft body manipulation mode means that the operator has fallen overboard. That is, in step S101, it is determined whether the operator has fallen into water from the watercraft body 100 (step S101).

In the exemplary embodiment illustrated in FIG. 11, the signal intensity of the radio wave transmitted from the biological information detection device 401 received by the operator's absence information acquisition sensor 17 is capable of being used in the determination in step S101. For example, when a tether switch and a pressure-sensitive sensor disposed beneath the seat portion 5 are mounted on the watercraft body 100 as the operator's absence information acquisition sensor 17 in addition to the biological information detection device 401, the determination in step S101 is performed based on one of the detection value of the pressure-sensitive sensor, the signal from the tether switch, and signal intensity of the radio wave transmitted from the biological information detection device 401.

Here, as described above, the determination as to whether the operator has fallen overboard is performed based on the result of detection of the operator's absence information acquisition sensor 17. Thus, the operator's absence information acquisition sensor 17 corresponds to the "falling overboard detector" in the present disclosure.

The greater the separation distance between the operator's absence information acquisition sensor 17 and the biological information detection device 401 is, the weaker the signal intensity of the radio wave from the biological information detection device 401 detected by the operator's absence information acquisition sensor 17 becomes. While the operator's absence information acquisition sensor 17 is mounted on the watercraft body 100, the biological information detection device 401 is attached to the operator. Thus, when the signal intensity of the radio wave from the biological information detection device 401 detected by the operator's absence information acquisition sensor 17 is small, the separation distance between the operator and the watercraft body 100 is large. That is, it can be said that when the signal intensity of the radio wave from the biological information detection device 401 detected by the operator's absence information acquisition sensor 17 is less than a predetermined determination intensity, the operator has fallen overboard from the watercraft body 100 and is absent from the watercraft body 100. Thus, when the detected signal intensity of the radio wave from the biological information detection device 401 is less than the determination intensity, the control device 400 determines that the operator has fallen overboard (been absent) from the watercraft body 100. When the detected signal intensity of the radio wave from the biological information detection device 401 is equal to or greater than the determination intensity, the control device 400 determines that the operator has not fallen overboard (been absent) from the watercraft body 100.

Upon determining in step S101 that the operator has not fallen overboard (been absent) from the watercraft body 100 (step S101: No), the control device 400 proceeds to step S107 and returns to step S1. On the other hand, upon determining in step 5101 that the operator has fallen overboard (been absent) from the watercraft body 100 (step S101: Yes), the control device 400 stores into the storage section 702 the coordinate location where the watercraft body 100 was located when the determination was made as the falling overboard location (step S102). Specifically, the control device 400 stores into the storage section 702, as the falling overboard location (the falling overboard location of the operator), the location of the watercraft body 100 specified by the manipulation information acquisition device 110 at when determining that the operator has fallen overboard (been absent) from the watercraft body 100. As described above, the manipulation information acquisition device 110 serves as the watercraft body location information acquisition device. For example, the manipulation information acquisition device 110 specifies, by the GPS device 71, a coordinate location of the watercraft body 100 when it is determined that the operator has fallen overboard (been absent) from the watercraft body 100 and stores the coordinate location P1 as the falling overboard location. As described above, the operator's falling overboard location is specified by the manipulation information acquisition device 110, and the manipulation information acquisition device 110 corresponds to the "falling overboard location specification section" in the present disclosure.

After step S102, the control device 400 proceeds to step S103. In step S103, the control device 400 transmits, to external entities of the small watercraft 2, the falling overboard location stored in the storage section 702 in step S102. Specifically, the external transmission device 402 of the control device 400 wirelessly transmits a signal including information on the falling overboard location to external entities of the small watercraft 2.

After step S102, the control device 400 performs a step similar to step S42 of the above-described exemplary embodiment illustrated in FIG. 7. Specifically, after step S102, the control device 400 determines whether the operator has not returned to the watercraft body 100 within the predetermined time T1 after determining in step S101 that the operator has fallen overboard (been absent) from the watercraft body 100 (step S104).

Upon determining that the operator has returned to the watercraft body 100 within the predetermined time Ti (step S101: No), the control device 400 deletes in step S104 the information on the falling overboard location stored in the storage section 702 in step S102, and proceeds to step S107. On the other hand, upon determining in step S104 that the operator has not returned to the watercraft body 100 within the predetermined time T1 (step 5104: Yes), the control device 400 sets the target location P2 to the falling overboard location stored in the storage section 702 in step S102 (step S105), proceeds to step S106, and proceeds to step S3.

Figure 12:
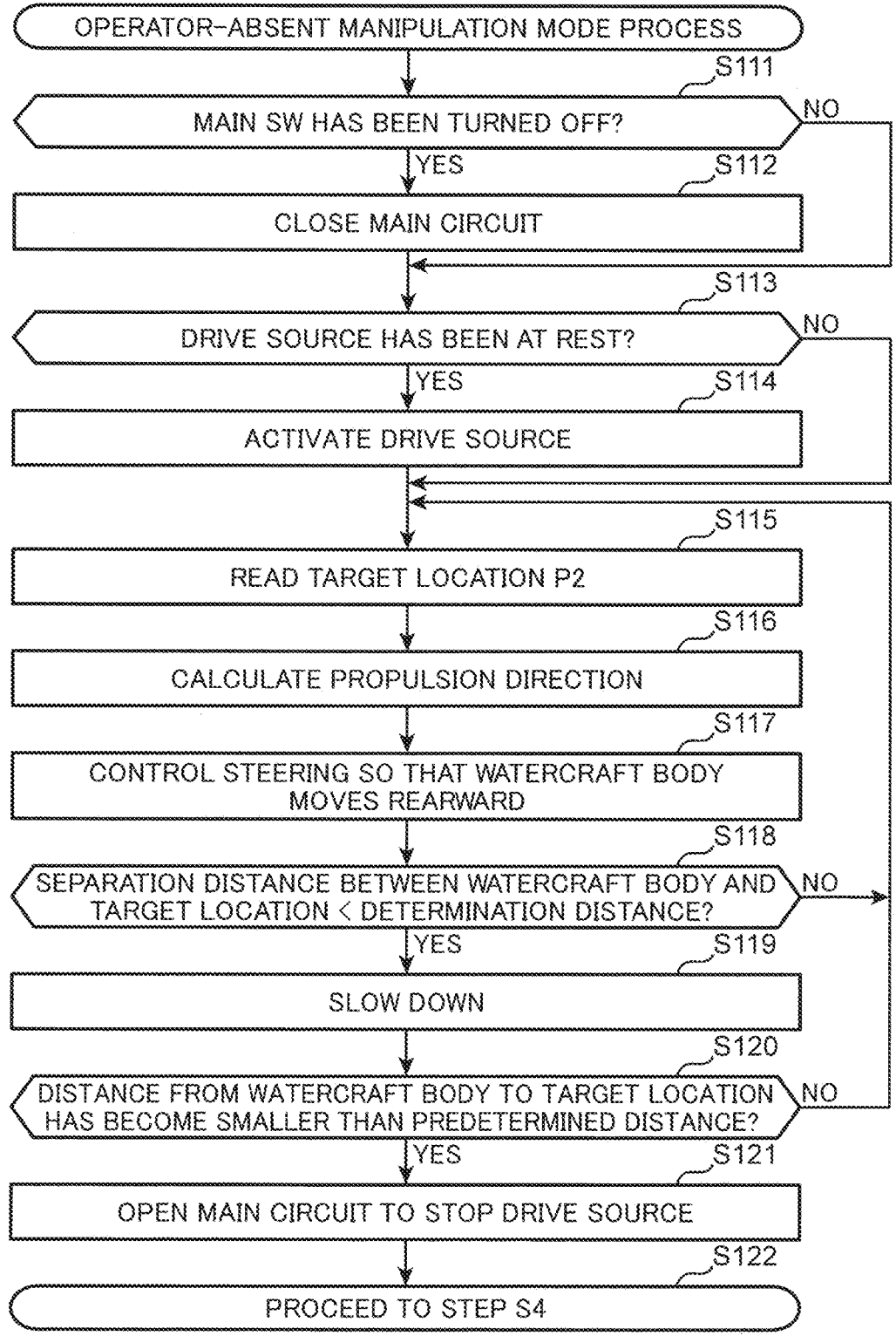
FIG. 12 is a sub-flowchart illustrating an operator-absent manipulation mode process according to an exemplary embodiment.

FIG. 12 is a view corresponding to FIG. 5, and is a sub-flowchart illustrating the operator-absent manipulation mode process according to the exemplary embodiment illustrated in FIGS. 9 and 11.

Steps S111 to S113 are processes similar to steps S31 to S33 of the above-described exemplary embodiment. Specifically, upon the start of the operator-absent manipulation mode process, the control device 400 determines whether the main switch 57 has been turned off (step S111). Upon determining in step S111 that the main switch 57 has not been turned off (step S111: No), the control device 400 proceeds to step S113. On the other hand, upon determining in step S111 that the main switch 57 has been turned off (step S111: Yes), the control device 400 performs control to close the main circuit 65 (step S112), and then proceeds the step to step S113.

In step S113, the control device 400 determines whether the drive source 18 is at rest. Upon determining in step S113 that the drive source 18 is not at rest (step S113: No), the control device 400 proceeds to step S115. On the other hand, upon determining in step S113 that the drive source 18 is at rest (step S113: Yes), the control device 400 starts the drive source 18 (step S114), and then proceeds to step S115.

In the exemplary embodiment illustrated in FIG. 12, the control device 400 reads the target location P2 in step S115. Specifically, the control device 400 calls, from the storage section 702, the target location P2, that is, the falling overboard location stored in the storage section 702 at the time of execution of the operator-absent manipulation mode switching determination process.

Next, similarly to step S36 of the above-described exemplary embodiment, the control device 400 calculates the propulsion direction of the watercraft body 100 based on the information on the target location P2, that is, the falling overboard location read in step S115 (step S116). For example, the control device 400 sets the direction approaching the target location P2 as the propulsion direction of the watercraft body 100.

Next, the control device 400 controls steering of the watercraft body 100 based on the result of the calculation of step S116 (step S117). That is, the control device 400 controls the steering device 6 to operate the watercraft body 100. At this time, in the exemplary embodiment illustrated in FIG. 12, the steering of the watercraft body 100 is controlled so that the watercraft body 100 moves rearward in the propulsion direction set in step S116. That is, the steering device 6 is controlled such that the direction from the bow toward the stern of the watercraft body 100 coincides with the set propulsion direction, and the watercraft body 100 is propelled toward the target location P2 in the orientation in which its stern faces the target location P2. At this time, the control device 400 drives the bucket actuator 15 so that the location of the reverse bucket 32 becomes the rearward movement position. The above-described steering device 6 corresponds to the "steering structure" in the present disclosure.

Next, the control device 400 determines whether the separation distance between the watercraft body 100 and the target location P2 is less than a predetermined determination distance (step S118). For example, the control device 400 specifies the watercraft body location P1, which is the coordinate location of the watercraft body 100, by the GPS device 71. Then, it is determined whether the distance D ($D=|P1-P2|$) between the watercraft body location P1 of the watercraft body 100 and the target location P2 is less than the determination distance. The determination distance is set in advance and stored in the storage section 701. The control device 400 calls the determination distance stored in the storage section 701 and performs the determination in step S118.

Upon determining in step S118 that the separation distance between the watercraft body 100 and the target location P2 is equal to or greater than the determination distance (step S118: No), the control device 400 returns to step S115. On the other hand, upon determining in step S118 that the separation distance between the watercraft body 100 and the target location P2 is less than the determination distance (step S118: Yes), the control device 400 slows down the watercraft body 100 (step S119). That is, upon determining that the separation distance between the watercraft body 100 and the target location P2 is less than the determination distance, the control device 400 reduces the propulsion speed of the watercraft body 100 as compared with the case where the separation distance between the watercraft body 100 and the target location P2 is equal to or more than the determination distance. Specifically, the control device 400 reduces output of the drive source 18, thereby reducing the propulsion speed of the watercraft body 100. After step S118, the control device 400 determines whether the watercraft body 100 has approached the target location to such an extent that the distance to the target location is smaller than a predetermined distance, similarly to step S38 in the above-described exemplary embodiment (step S120). For example, it is determined whether the distance D between the watercraft body 100 and the target location P2 has reached equal to or less than a reference distance. This reference distance is set to a value smaller than the determination distance.

Next, the control device 400 opens the main circuit 65 and stops the drive source 18, similarly to step S39 of the above-described exemplary embodiment (step S121). Thus, the operator-absent manipulation mode process in step S3 ends. Thereafter, the control device 400 proceeds to step S4 (step S122).

As described above, the small watercraft system of the exemplary embodiment illustrated in FIG. 9 and the like includes the watercraft body 100 and the watercraft body manipulation member 16 similarly to the above-described exemplary embodiment illustrated in FIG. 2 and the like. The small watercraft system of the exemplary embodiment illustrated in FIG. 9 and the like includes the operator's absence information acquisition sensor 17 that detects that the operator has fallen overboard, the manipulation information acquisition device 110 that specifies the operator's falling overboard location when the operator's falling overboard is detected, and the storage section 702 that stores the operator's falling overboard location specified by the manipulation information acquisition device 110. The small watercraft system of this exemplary embodiment includes the external transmission device 402 that is mounted on the watercraft body 100 and transmits the falling overboard location stored in the storage section 702 to external entities of the small watercraft 2.

According to the small watercraft system of this exemplary embodiment, the operator's falling overboard location is stored in the storage section 702, and this falling overboard location is transmitted from the external transmission unit 402 to external entities of the small watercraft 2. Therefore, it is possible to notify a person outside the small watercraft 2 of the falling overboard location, and support rescue activities for the person falling overboard.

In this exemplary embodiment, the operator's absence information acquisition sensor 17 can detect the signal intensity of a radio wave emitted from the biological information detection device 401 that is carried by the operator and can detect biological information of the operator. Therefore, it is possible to determine whether the operator has fallen overboard based on this signal intensity of the radio wave.

The small watercraft system of this exemplary embodiment includes the drive source 18 that allows the watercraft body 100 to plane and the steering device 6 that steers the watercraft body 100, similarly to the above-described exemplary embodiment illustrated in FIG. 2 and the like. In this exemplary embodiment, the control device 400 controls the drive source 18 and the steering device 6 so that the watercraft body 100 returns to the falling overboard location stored in the storage section 702. Specifically, the control device 400 starts the drive source 18 (step S114) and controls the steering device 6 so as to be propelled toward the target location P2, that is, the falling overboard location (step S117). Therefore, it is possible to reduce labor of a person falling overboard to return to the watercraft body 100.

Moreover, in the small watercraft system of this present exemplary embodiment, when the watercraft body 100 moves toward the target location P2, that is, when the watercraft body 100 is returned to the falling overboard location, the propulsion speed of the watercraft body 100 is made smaller when the separation distance between the falling overboard location and the watercraft body 100 is less than the determination distance than when the separation distance is equal to or more than the determination distance. Thus, when the watercraft body 100 is away from the person falling overboard by a distance equal to or greater than the determination distance, the watercraft body 100 can be moved to the vicinity of the person falling overboard at an early stage. Moreover, when the watercraft body 100 approaches the person falling overboard to a location less than the determination distance, it is possible to avoid an adverse effect on the person falling overboard caused by the watercraft body 100 propelling around the person falling overboard at a high speed. For example, the wave height of the sailing wave generated around the person falling overboard can be suppressed to be small.

In the small watercraft system of this exemplary embodiment, the control device 400 controls the steering device 6 so that the watercraft body 100 moves rearward and returns to the falling overboard location. Therefore, it becomes possible to return the watercraft body 100 to the falling overboard location at an early stage. Specifically, the watercraft body 100 moves from when the operator 100 falls overboard to when the drive source 18 is stopped. There is a high possibility that this moving direction is the forward direction. In a case where the watercraft body 100 moves in the forward direction from the falling overboard location, in order to move forward the watercraft body 100 to the falling overboard location and return, it is necessary to change the orientation of the watercraft body 100 by making a U-turn or the like. On the other hand, in a case where the watercraft body 100 moves in the forward direction from the falling overboard location, it is not necessary to change the orientation of the watercraft body 100 when the watercraft body 100 is moved rearward to the falling overboard location and returned. Therefore, there is a high possibility that the return time of the watercraft body 100 to the falling overboard location can be shortened by moving the watercraft body 100 rearward and returning rather than by moving the watercraft body 100 forward and returning to the falling overboard location.

Here, in the above exemplary embodiment, the case has been described where the operator's absence information acquisition sensor 17 detects the signal intensity of the radio wave transmitted from the biological information detection device 401, and the control device 400 can perform the operator-absent manipulation mode switching determination based on this signal intensity of the radio wave to determine whether the operator has fallen overboard from the watercraft body 100. This determination using the biological information detection device 401 is only required to be performed based on the state of the radio wave transmitted from the biological information detection device 401 to external entities. The parameter used for this determination is not limited to the signal intensity of the radio wave transmitted from the biological information detection device 401. For example, it may be determined whether the operator has fallen overboard from the watercraft body 100 based on the speed of the radio wave transmitted from the biological information detection device 401. Specifically, the watercraft body 100 may be provided with communication equipment that wirelessly communicates with the biological information detection device 401, and whether the operator has fallen overboard from the watercraft body 100 may be determined based on the communication speed between the communication equipment and the biological information detection device 401.

(Modification)

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. Changes, additions, or omissions may be made to the above configurations without departing from the scope of the invention.

For example, the small watercraft 2 is not limited to a form in which the operator sits astride the seat portion 5, and may be another form of watercraft. For example, a small watercraft has a flat portion formed at the bottom of the watercraft, and the orientation of the watercraft, namely, the level of the waterline, is varied by a lift force generated due to propulsion of the watercraft on water. Specifically, when a small watercraft is being propelled, the bow of the watercraft is located at a higher level than the stern of the watercraft. The small watercraft 2 is not limited to a PWC and may be, for example, a motorboat. According to the embodiments described above, for example, in the event that the operator is dropped off from the watercraft body 100 because of a propulsion-induced change in orientation of the small watercraft 2, the operator's burden of approaching the watercraft body 100 can be reduced.

The steering device 6 of each exemplary embodiment described above includes, for example, a manipulation force transmission mechanism for allowing the operator to steer the watercraft in the watercraft body manipulation mode, and the mechanism includes a wire through which a pivoting manipulation performed on the handle 56 is transmitted to the steering nozzle 30. Alternatively, the small watercraft 2 may include a steering manipulation amount detection sensor that detects the amount of pivoting manipulation of the handle 56. In this case, in the watercraft body manipulation mode, the control device 400 may control the nozzle actuator 33, for example, based on a detection value provided from the steering manipulation amount detection sensor.

Thus, in the watercraft body manipulation mode, the control device 400 can control steering of the watercraft body 100 as a function of the amount of manipulation of the handle 56 by the operator. In the operator-absent manipulation mode, as described above, the control device 400 controls the nozzle actuator 33 based on a steering command independent of manipulation of the handle 56. Thus, the advantages described above are achieved.

In the operator-absent manipulation mode, the control device 400 may operate in any manner as long as the control device 400 can operate the watercraft body 100 independently of the watercraft body manipulation command. The operations described in the above exemplary embodiments as those performed by the control device 400 in the operator-absent manipulation mode are merely examples. In an exemplary embodiment, in the operator-absent manipulation mode, the control device 400 controls the nozzle actuator 33 and the bucket actuator 15 to control the propulsion direction of the watercraft body 100. In the operator-absent manipulation mode, the control device 400 may control only one of the nozzle actuator 33 and the bucket actuator 15. For example, the control device 400 may use only the nozzle actuator 33 to control the orientation of the watercraft body 100 in the leftward/rightward direction and bring the watercraft body 100 close to the target location P2. In this case, the small watercraft 2 need not include the bucket actuator 15.

In the operator-absent manipulation mode, the control device 400 may control the bucket actuator 15 for a purpose other than steering. For example, upon determining that the propulsion speed of the watercraft body 100 has exceeded a predetermined value, the control device 400 may control the bucket actuator 15 such that a jet of water is ejected forward to reduce the propulsion speed of the watercraft body 100. Further, for example, upon determining that the watercraft body 100 has moved to a location within a predetermined distance from the target location P2, the control device 400 may cause the propulsion speed of the watercraft body 100 to be lower than when the watercraft body 100 is located outside the predetermined distance from the target location P2. In this case, for example, the control device 400 can decrease the propulsion speed of the watercraft body 100 by controlling either the drive source 18 or the bucket actuator 15. Thus, for example, the inertial movement of the watercraft body 100 can be reduced.

In an exemplary embodiment, even when the watercraft body 100 has approached the target location P2, the control device 400 may continue the operator-absent manipulation mode unless a command to end the operator-absent manipulation mode (e.g., a mode switching command to perform switching from the operator-absent manipulation mode to the watercraft body manipulation mode) is provided from the outboard device 3. The control device 400 may operate irrespective of a result of detection by the obstacle detection sensor 12. The control device 400 may operate the watercraft body 100 at the same output (e.g., the same propulsion power and propulsion speed of the watercraft body 100) in both the operator-absent manipulation mode and the watercraft body manipulation mode.

The above embodiments present examples where the mode switching condition for switching from the watercraft body manipulation mode to the operator-absent manipulation mode includes the condition that the operator is absent from the watercraft body 100 and further includes other conditions such as the condition that the watercraft body 100 is away from a reference location by a distance equal to or greater than a predetermined distance and the condition that a mode switching command has been received (the control device 400 determines in step S24 whether the latter condition is satisfied). The mode switching condition for switching from the watercraft body manipulation mode to the operator-absent manipulation mode is not limited to that as described in the above embodiments. The mode switching condition may consist solely of the operator's absence condition that the operator is absent from the watercraft body 100, or may include the operator's absence condition and either of the condition that the watercraft body 100 is away from a reference location by a distance equal to or greater than a predetermined distance and the condition that a mode switching command has been received (the control device 400 determines in step S24 whether the latter condition is satisfied). The mode switching condition for switching from the watercraft body manipulation mode to the operator-absent manipulation mode may include the operator's absence condition and a condition other than those mentioned above (an example of the other condition is that no input has been provided through manipulation of the watercraft body manipulation member 16 for a predetermined time).

For example, the control device 400 may be configured not to perform switching from the watercraft body manipulation mode to the operator-absent manipulation mode when manipulation of the accelerator lever 55 has been detected. Further, the mode switching condition for switching from the watercraft body manipulation mode to the operator-absent manipulation mode may include, in addition to the operator's absence condition, a condition that a passenger does not sit on the operator seat 51 as a substitute operator.

The control device 400 may determine that the operator is absent from the watercraft body 100 based on an indirect change in detection value which occurs once the operator becomes absent from the watercraft body 100. For example, the control device 400 may determine that the operator is absent from the watercraft body 100 based on a change in orientation of the watercraft body 100 which occurs once the operator becomes absent from the watercraft body 100. Alternatively, the control device 400 may determine that the operator is absent from the watercraft body 100 based on a change (e.g., an abrupt change) in propulsion speed of the watercraft body 100 which occurs once the operator becomes absent from the watercraft body 100. Alternatively, the control device 400 may determine that the operator is absent from the watercraft body 100 based on a change in output of a radio wave transmitted from the outboard device 3 carried by the operator. The control device 400 can make these determinations as to the absence of the operator from the watercraft body 100 with the aid of, for example, known sensors.

For example, while in an exemplary embodiment above the reference location of the watercraft body 100 for determination in step S22 is set as the target location P2, the reference location and the target location P2 may be different from each other. For example, the reference location may be a mooring location where the small watercraft 2 is moored, and the target location P2 may be the location of the operator carrying the outboard device 3. In the case where the reference location is a mooring location where the small watercraft 2 is moored, the target location P2 may be another mooring location where the small watercraft 2 is to be moored subsequently. Alternatively, the reference location may be a stop location where the watercraft body 100 was located when a watercraft body stopping command was input through the watercraft body stopping manipulation member.

In the above-described exemplary embodiment illustrated in FIG. 2, the target location P2 may be a location input by the operator and stored into the storage section 702 of the operator-absent control unit 7 before switching of the mode of the small watercraft 2 from the watercraft body manipulation mode to the operator-absent manipulation mode. The target location P2 may be a location input by the operator to the control device 400 through the outboard device 3 during the operator-absent manipulation mode. The target location P2 may be a target location to which the operator who is absent from the watercraft body 100 intends to go. In this case, for example, the operator can catch the small watercraft 2 at the target location P2 different from the location where the operator became absent from the watercraft body 100.

An exemplary previously described above presents an example where the drive source 18 is an engine and where, during the operator-absent manipulation mode, the control device 400 controls the amount of intake air of the engine to reduce the propulsion power of the watercraft body 100. The present disclosure is not limited to this example. In another example, the drive source 18 may include an additional actuator for output adjustment and, in this case, the control device 400 may control this actuator during the operator-absent manipulation mode. Alternatively, for example, the control device 400 may, during the operator-absent manipulation mode, reduce the propulsion power of the watercraft body 100 by controlling a fuel injector or an ignition plug instead of controlling an electrically-operated throttle device. The drive source 18 may be embodied by a device other than the engine, such as by an electric motor.

Figure 13:
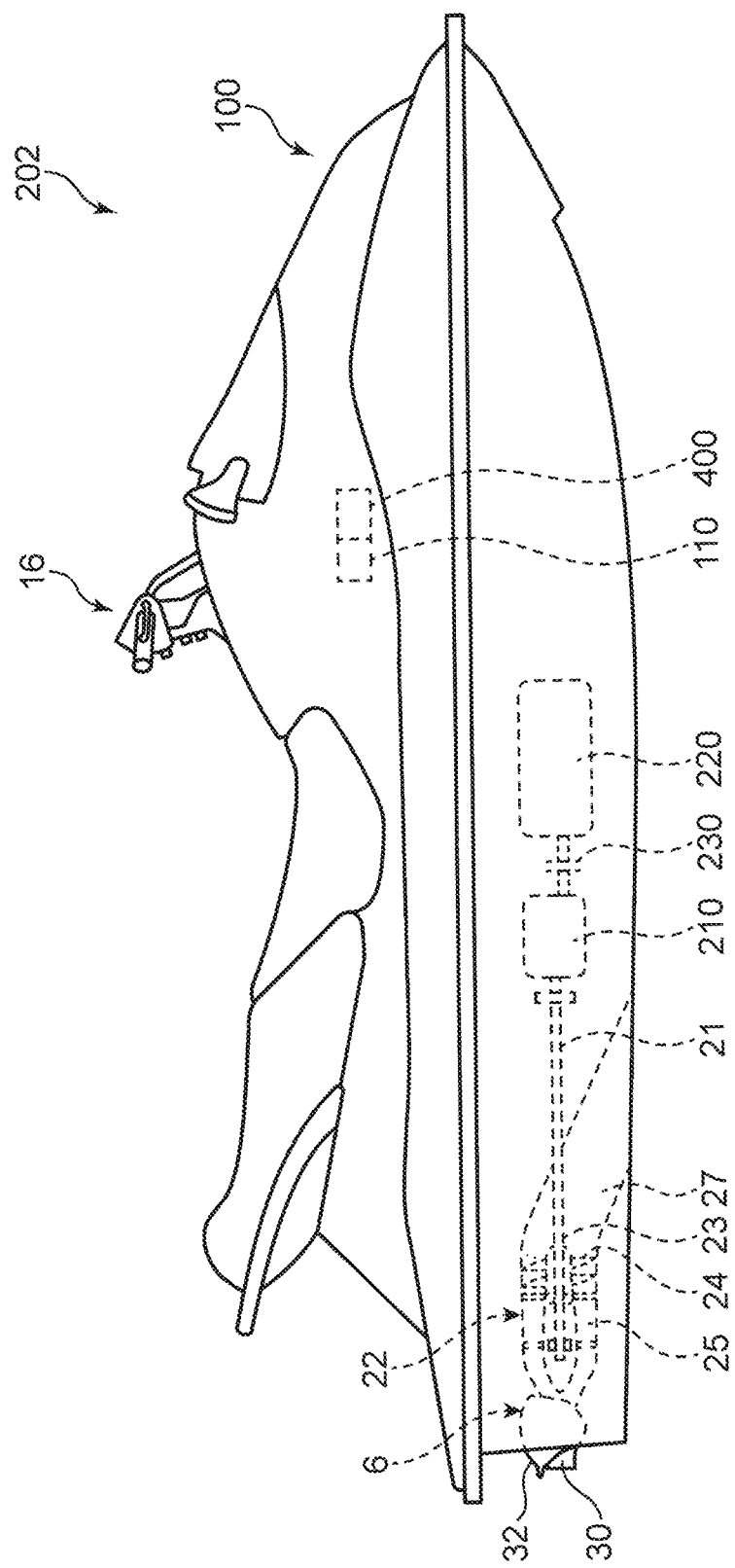
FIG. 13 is a side view illustrating another example of a small watercraft.

The small watercraft 2 may be mounted with, as the drive source 18, both an engine 210 and an electric motor 220. FIG. 13 is a side view illustrating an example of a small watercraft 202 mounted with, as the drive source 18, the engine 210 and the electric motor 220. In the small watercraft 202 illustrated in FIG. 13, the electric motor 220 is mounted on the watercraft body 100 in a state of being coupled to its output shaft and the propeller shaft 21 of the water jet pump 22. The engine 210 is connected to the electric motor 210 via a clutch 230 so as to be connectable and disconnectable. Specifically, the output shaft of the engine 210 and the output shaft of the electric motor 220 are connected via the clutch 230.

In the small watercraft 202 as illustrated in FIG. 13, depending on the connection state between the engine 210 and the electric motor 220 and the power feed state to the electric motor 220, the propulsion pattern of the small watercraft 202 can be switched among a pattern in which only the engine 210 is driven as the drive source 18, a pattern in which only the electric motor 220 is driven as the drive source 18, and a pattern in which both the engine 210 and the electric motor 220 are driven as the drive source 18.

In the example of FIG. 13, a motor having a relatively small output is used as the electric motor 220, and the electric motor 220 is used as the drive source 18 for slowing down. That is, only the electric motor 220 is driven as the drive source 18 when the watercraft body 100 slows down. According to such the small watercraft 202, the small watercraft 202 can be propelled in an appropriate propulsion pattern in accordance with the state around the watercraft body 100 and the like. It is possible to enhance safety by, for example, applying the small watercraft system according to the above-described exemplary embodiment illustrated in FIG. 9 and the like to the small watercraft 220, stopping the engine 210 in a case where the operator's falling overboard is detected, and driving the electric motor 220 so that the watercraft body 100 returns to the falling overboard location. Specifically, the electric motor 220 is smaller than the engine 210 in vibration during driving. Therefore, when only the electric motor 220 is driven, waves are less likely to occur around the watercraft body 100 than when the engine 210 is driven. Therefore, it is possible to enhance safety of the person falling overboard. Here, the electric motor 220 corresponds to the "second drive source" in the present disclosure, and the engine 210 corresponds to the "first drive source" in the present disclosure.

As the drive source 18, a plurality of electric motors may be mounted on the watercraft body 100. A plurality of electric motors having different outputs may be mounted on the watercraft body 100, an electric motor having a small output may be used as a motor for slowing down, and an electric motor having a large output may be used as a motor for normal propulsion. For example, the small watercraft of the small watercraft system according to the above-described exemplary embodiment illustrated in FIG. 9 and the like may be mounted with a plurality of electric motors having different outputs, and when the operator's falling overboard is detected, the motor for normal propulsion may be stopped and only the motor for slowing down may be driven.

In each of the above exemplary embodiments, the water jet pump 22 and the steering nozzle 30 are mounted on the watercraft body 100, and the water ejection direction of the water jet pump 22 and the propulsion direction of the watercraft body 100 are changed by changing the orientation of the steering nozzle 30. The configuration for changing the propulsion direction of the watercraft body 100 is not limited to this. For example, the propulsion direction of the watercraft body 100 may be changed by providing one water jet pump to the watercraft body 100 at each of locations separated in the left and right direction and adjusting the flow rates of the water ejected from these two water jet pumps.

While FIG. 2 shows signal lines connected to and leading from the electric power supply device 14, this signal line arrangement is merely an example. The electric power supply device 14 may be embodied by employing another existing technology. For example, the electric components 8 may be connected via electric cables for bus connection so as to be capable of signal exchange. Alternatively, the electric components 8 may be configured to exchange signals with external entities through a communication device which is mounted on the watercraft body 100 and which is capable of transmitting and receiving electromagnetic waves. The processing circuits of the control units 7, 13, and 19 need not be separate from each other but may be integrally constructed. Part or all of the functions of the control device 400 may be implemented, for example, by a processing device such as an outboard server device capable of communication via the watercraft body communication device 10.

The control device 400 (in particular the operator-absent control unit 7) may be capable of operating with the main circuit 65 open by having a configuration other than that described above in exemplary embodiments. For example, the operator-absent control unit 7 may be configured to operate by receiving supply of electric power from a sub-battery mounted separately from the battery 38 shown in FIG. 4. The operator-absent control unit 7 may include a wake-up circuit that enables the operator-absent control unit 7 to receive supply of electric power from the battery 38 for every predetermined duration. In this case, the operator-absent control unit 7 can perform the determination as to satisfaction of the mode switching condition by receiving supply of electric power through the wake-up circuit for every determination duration. For example, the control device 400 may operate for every predetermined determination duration in an activity time zone expected from the intended use of the small watercraft 2 (e.g., during daytime hours) or in a predetermined period of time after turning-off of the main switch 57. In this case, the control device 400 can be prevented from unnecessarily consuming electric power.

The watercraft body location information acquisition device that acquires location information indicating the location of the watercraft body 100 need not be mounted on the watercraft body 100. The target location information acquisition device that acquires location information indicating the target location P2 need not be mounted on the watercraft body 100.

In each of the above exemplary embodiments, the small watercraft system including the small watercraft 2 and the outboard device 3 has been described. It should be noted, however, that the small watercraft 2 has in itself inventive features independently of the outboard device 3. That is, the small watercraft 2 which includes the control device 400 and which is therefore able to be manipulated in the operator-absent manipulation mode is within the scope of the present disclosure. For example, the present disclosure encompasses: the control device 400 which can, independently of the outboard device 3, perform switching from the watercraft body manipulation mode to the operator-absent manipulation mode based on detection values of various sensors mounted on the watercraft body 100 and accomplish movement of the watercraft body 100 in the operator-absent manipulation mode; and the small watercraft 2 including the control device 400.

The embodiments and modifications thereof include the following disclosure.

A small watercraft system according to an aspect of the present disclosure includes a watercraft body; a watercraft body manipulation structure that is mounted on the watercraft body and through which a watercraft body manipulation command is input by an operator; a drive source that is mounted on the watercraft body and that allows the watercraft body to plane; a steering structure that is mounted on the watercraft body and that allows the watercraft body to be steered; and circuitry that is mounted on the watercraft body and that is configured to control the drive source and the steering structure to operate the watercraft body, wherein the circuitry is configured to determine whether a mode switching condition is satisfied, the mode switching condition including an operator's absence condition that the operator is absent from the watercraft body, and upon determining that the mode switching condition is satisfied, the circuitry is configured to execute an operator-absent manipulation mode in which the circuitry moves the watercraft body by controlling the drive source and the steering structure based on an operator-absent manipulation command independent of the watercraft body manipulation command.

The small watercraft system may further include a connector connecting the drive source to the circuitry. In this case, the drive source is preferably an internal combustion engine, and if the internal combustion engine is at rest at the beginning of execution of the operator-absent manipulation mode by the circuitry, the circuitry is configured to control the connector to start the internal combustion engine.

In the operator-absent manipulation mode, the circuitry is preferably configured to move the watercraft body at a lower propulsion power and a lower speed than in a watercraft body manipulation mode in which the watercraft body is operated based on the watercraft body manipulation command.

The small watercraft system may further include a watercraft body communicator that is configured to receive an outboard signal transmitted from external circuitry remote from the watercraft body. In this case, in the operator-absent manipulation mode, the circuitry is preferably configured to operate the watercraft body based on the outboard signal received by the watercraft body communicator.

In the operator-absent manipulation mode, the circuitry is preferably configured to stop operation of the watercraft body based on an outboard stopping command contained in the outboard signal.

In the operator-absent manipulation mode, the circuitry is preferably configured to steer the watercraft body based on an outboard steering command contained in the outboard signal.

The external circuitry is preferably portable by the operator.

The small watercraft system may further include a watercraft body activation manipulation structure that is mounted on the watercraft body and through which a watercraft body activation command is input by the operator. In this case, in the operator-absent manipulation mode, the circuitry is preferably configured to control a power supply circuit and instruct the power supply circuit to supply electric power to the drive source and the steering structure based on an operator-absent activation command independent of the watercraft body activation command input through the watercraft body activation manipulation structure.

The small watercraft system may further include a watercraft body communicator that is configured to receive an outboard signal transmitted from external circuitry remote from the watercraft body. In this case, the mode switching condition preferably further includes a condition that a mode switching command contained in the outboard signal has been received.

The mode switching condition preferably further includes a condition that a distance between a predetermined reference location and a location of the watercraft body has exceeded a reference distance.

The reference location is preferably a location of the operator.

The small watercraft system may further include a watercraft body stopping manipulation structure that is mounted on the watercraft body and through which a watercraft body stopping command is input by the operator. In this case, the reference location is preferably a stop location where the watercraft body was located when the watercraft body stopping command was input through the watercraft body stopping manipulation structure.

The reference location is preferably a location where the operator became absent from the watercraft body which was being propelled.

In the operator-absent manipulation mode, the circuitry is preferably configured to generate the operator-absent manipulation command configured to reduce a distance between a predetermined target location and a location of the watercraft body, and moves the watercraft body based on the operator-absent manipulation command.

In the operator-absent manipulation mode, the circuitry is preferably configured to operate the watercraft body based on location information indicating the location of the watercraft body, the location information being acquired by a watercraft body location information acquirer.

In the operator-absent manipulation mode, the circuitry is preferably configured to operate the watercraft body based on target location information acquired by a target location information acquirer.

The small watercraft system may further include a watercraft body stopping manipulation structure that is mounted on the watercraft body and through which a watercraft body stopping command is input by the operator. In this case, the target location is preferably any one of the following locations: a location of the operator; a stop location where the watercraft body was located when the watercraft body stopping command was input through the watercraft body stopping manipulation structure; and a location where the operator became absent from the watercraft body which was being propelled.

The small watercraft system may further include an obstacle detection sensor that is configured to detect the presence or absence of an obstacle located in surroundings of the watercraft body. In this case, the mode switching condition preferably further includes a condition that the obstacle detection sensor has not detected any obstacle.

A method of controlling a small watercraft according to another aspect of the present disclosure includes a method of controlling a small watercraft, wherein the small watercraft includes: a watercraft body; a watercraft body manipulation structure that is mounted on the watercraft body and through which a watercraft body manipulation command is input by an operator; a drive source that is mounted on the watercraft body and that allows the watercraft body to plane; and a steering structure that is mounted on the watercraft body and that allows the watercraft body to be steered, the method comprising: determining whether a mode switching condition is satisfied, wherein the mode switching condition includes an operator's absence condition that the operator is absent from the watercraft body; and executing an operator-absent manipulation mode upon determining that the mode switching condition is satisfied, wherein in the operator-absent manipulation mode, the watercraft body is moved by controlling the drive source and the steering structure based on an operator-absent manipulation command independent of the watercraft body manipulation command.

A small watercraft system according to another aspect of the present disclosure includes a watercraft body; a watercraft body manipulation structure that is mounted on the watercraft body and through which a watercraft body manipulation command is input by an operator; a drive source that is mounted on the watercraft body and that allows the watercraft body to plane; means for steering that is mounted on the watercraft body and that allows the watercraft body to be steered; and means for controlling that is mounted on the watercraft body and that is configured to control the drive source and the means for steering to operate the watercraft body, the means for controlling including a processor, wherein the processor is configured to determine whether a mode switching condition is satisfied, the mode switching condition including an operator's absence condition that the operator is absent from the watercraft body, and upon determining that the mode switching condition is satisfied, the processor is configured to execute an operator-absent manipulation mode in which the processor moves the watercraft body by controlling the drive source and the means for steering based on an operator-absent manipulation command independent of the watercraft body manipulation command.

A small watercraft system according to another aspect of the present disclosure includes a watercraft body; a watercraft body manipulation structure that is mounted on the watercraft body and through which a watercraft body manipulation command is input by an operator; a falling overboard detector that is mounted on the watercraft body and that detects that an operator of the small watercraft has fallen overboard; a falling overboard location specification section that is mounted on the watercraft body and that specifies a falling overboard location of the operator when the operator's falling overboard is detected by the falling overboard detection section; and a storage section that is mounted on the watercraft body and that stores the falling overboard location specified by the falling overboard location specification section.

The small watercraft system preferably include an external transmission device that is mounted on the watercraft body and that transmits the falling overboard location stored in the storage section to external entities of the small watercraft.

The falling overboard detection section preferably detects that an operator of the small watercraft has fallen overboard based on a state of a radio wave emitted from portable equipment that is capable of being carried by the operator and detecting biological information of the operator.

A small watercraft system may further include a drive source that allows the watercraft body to plane; a steering structure that allows the watercraft body to be steered; and a controller that is mounted on the watercraft body and that is configured to control the drive source and the steering structure so that the watercraft body returns to the falling overboard location stored by the storage section. In this case, when controlling the drive source and the steering structure so that the watercraft body returns to the falling overboard location, the controller is preferably configured to control the drive source so that propulsion speed of the watercraft body becomes lower when a separation distance between the falling overboard location and the watercraft body is less than a predetermined determination distance than when the separation distance is equal to or greater than the determination distance.

The controller is preferably configured to control the steering structure so that the watercraft body moves rearward and returns to the falling overboard location.

The drive source may include a first drive source and a second drive source for slowing down the watercraft body. In this case, the controller is preferably configured to stop the first drive source when the falling overboard detection section detects that an operator of the small watercraft has fallen overboard, and drive the second drive source so that the watercraft body returns to the falling overboard location.

What is claimed is:

1. A small watercraft system comprising:
    a watercraft body;
    a watercraft body manipulation structure that is mounted on the watercraft body and through which a watercraft body manipulation command is input by an operator;
    a falling overboard detector that is mounted on the watercraft body and that detects that an operator of the small watercraft has fallen overboard;
    a falling overboard location specification section that is mounted on the watercraft body and that specifies a falling overboard location of the operator when the operator's falling overboard is detected by the falling overboard detector;
    a storage section that is mounted on the watercraft body and that stores the falling overboard location specified by the falling overboard location specification section;
    a drive source that allows the watercraft body to plane;

a steering structure that allows the watercraft body to be steered; and circuitry that is mounted on the watercraft body and that is configured to control the drive source and the steering structure so that the watercraft body returns to the falling overboard location stored by the storage section.

2. The small watercraft system according to claim 1, comprising: an external transmission device that is mounted on the watercraft body and that transmits the falling overboard location stored in the storage section to external entities of the small watercraft.

3. The small watercraft system according to claim 1, wherein the falling overboard detector detects that the operator of the small watercraft has fallen overboard based on a state of a radio wave emitted from portable equipment that is capable of being carried by the operator and detecting biological information of the operator.

4. A small watercraft system comprising:

a watercraft body:

a watercraft body manipulation structure that is mounted on the watercraft body and through which a watercraft body manipulation command is input by an operator;

a falling overboard detector that is mounted on the watercraft body and that detects that an operator of the small watercraft has fallen overboard;

a falling overboard location specification section that is mounted on the watercraft body and that specifies a falling overboard location of the operator when the operator's falling overboard is detected by the falling overboard detector;

a storage section that is mounted on the watercraft body and that stores the falling overboard location specified by the falling overboard location specification section;

a drive source that allows the watercraft body to plane;

a steering structure that allows the watercraft body to be steered; and circuitry that is mounted on the watercraft body and that is configured to control the drive source and the steering structure so that the watercraft body returns to the falling overboard location stored by the storage section, wherein when controlling the drive source and the steering structure so that the watercraft body returns to the falling overboard location, the circuitry is configured to control the drive source so that propulsion speed of the watercraft body becomes lower when a separation distance between the falling overboard location and the watercraft body is less than a predetermined determination distance than when the separation distance is equal to or greater than the determination distance.

5. The small watercraft system according to claim 4, wherein the circuitry is configured to control the steering structure so that the watercraft body moves rearward and returns to the falling overboard location.

6. The small watercraft system according to claim 4, wherein the drive source includes a first drive source and a second drive source for slowing down the watercraft body, and the circuitry is configured to stop the first drive source when the falling overboard detector detects that an operator of the small watercraft has fallen overboard, and drive the second drive source so that the watercraft body returns to the falling overboard location.

7. A small watercraft system comprising:

a watercraft body;

a watercraft body manipulation structure that is mounted on the watercraft body and through which a watercraft body manipulation command is input by an operator;

a falling overboard detector that is mounted on the watercraft body and that detects that an operator of the small watercraft has fallen overboard;

a falling overboard location specification section that is mounted on the watercraft body and that specifies a coordinate location of the watercraft body when the operator's falling overboard is detected by the falling overboard detector; and a storage section that is mounted on the watercraft body and that stores the coordinate location specified by the falling overboard location specification section.

* * * * *